(12) United States Patent
Kondo et al.

(10) Patent No.: US 7,095,688 B2
(45) Date of Patent: Aug. 22, 2006

(54) SIMULTANEOUS RECORDING AND REPRODUCTION APPARATUS AND SIMULTANEOUS MULTI-CHANNEL REPRODUCTION APPARATUS

(76) Inventors: Satoshi Kondo, 7-17, Otokoyama-shigetsu, Yawata-shi, Kyoto-fu (JP); Hideki Fukuda, 406-7, Hikida-cho, Nara-shi, Nara-ken (JP); Yoshinari Takemura, 2-8-11, Befu, Settu-shi, Osaka-fu (JP); Masaaki Kondo, 3-13-17, Nagaohigashimachi, Hirakata-shi, Osaka-fu (JP); Yuji Takagi, 2-29-1-309, Deguchi, Hirakata-shi, Osaka-fu (JP); Keiichi Kawashima, 45-2-104, Sakuragaoka-cho, Hirakata-shi, Osaka-fu (JP)

( * ) Notice: Subject to any disclaimer, the term of this patent is extended or adjusted under 35 U.S.C. 154(b) by 312 days.

(21) Appl. No.: 10/652,203

(22) Filed: Sep. 2, 2003

(65) Prior Publication Data
US 2004/0037187 A1 Feb. 26, 2004

Related U.S. Application Data

(62) Division of application No. 09/413,326, filed on Oct. 6, 1999, now Pat. No. 6,678,227.

(30) Foreign Application Priority Data

Oct. 6, 1998 (JP) .......................... 10-283682
Oct. 6, 1998 (JP) .......................... 10-283683

(51) Int. Cl.
*G11B 5/09* (2006.01)

(52) U.S. Cl. .................................. 369/47.33; 369/47.55
(58) Field of Classification Search ............. 369/32.01, 369/33.01, 47.16, 47.23, 47.24, 47.29, 47.3, 369/47.31, 47.32, 47.33, 47.34, 47.55, 53.37
See application file for complete search history.

(56) References Cited

U.S. PATENT DOCUMENTS

| | | | | |
|---|---|---|---|---|
| 5,490,130 A | * | 2/1996 | Akagiri | 369/124.08 |
| 5,566,144 A | | 10/1996 | Shinada | |
| 5,687,150 A | | 11/1997 | Nonaka et al. | |
| 5,950,164 A | * | 9/1999 | Takahashi | 704/270 |
| 6,061,404 A | * | 5/2000 | Yonemitsu et al. | 375/242 |
| 6,263,411 B1 | | 7/2001 | Kamel et al. | |
| 6,553,177 B1 | | 4/2003 | Shimizu et al. | |

FOREIGN PATENT DOCUMENTS

| | | |
|---|---|---|
| JP | 5-308873 | 11/1993 |
| JP | 6-14288 | 1/1994 |

*Primary Examiner*—Paul W. Huber

(57) ABSTRACT

When recording and reproduction are performed at the same time, if a system controller detects that an amount of data accumulated in a buffer memory exceeds a predetermined value, the system controller stops data reading from an optical disk temporarily and records data accumulated in the buffer memory continuously to the optical disk. Then, an image is prevented from becoming abnormal when a reproduction position catches up to a recording position. Further, a system controller monitors a zone in an optical disk, to which recording is performed and controls a motor at an appropriate revolution number for the recording to the zone. Further, reproduction is performed by maintaining the revolution number. Then, even if the recording position and the reproduction position belong to different zones in a recording medium, a transition time from recording to reproduction is prevented from becoming long.

23 Claims, 20 Drawing Sheets

FOREIGN PATENT DOCUMENTS

| | | |
|---|---|---|
| JP | 6-245157 | 9/1994 |
| JP | 7-131754 | 5/1995 |
| JP | 7-226027 | 8/1995 |
| JP | 8-124365 | 5/1996 |
| JP | 8-138318 | 5/1996 |
| JP | 8-256304 | 10/1996 |
| JP | 8-279976 | 10/1996 |
| JP | 9-167441 | 6/1997 |
| JP | 9-213055 | 8/1997 |
| JP | 10-56620 | 2/1998 |
| JP | 10-162507 | 6/1998 |
| JP | 10-322662 | 12/1998 |
| JP | 11-120698 | 4/1999 |
| JP | 11-187352 | 7/1999 |
| JP | 11-273246 | 10/1999 |

* cited by examiner

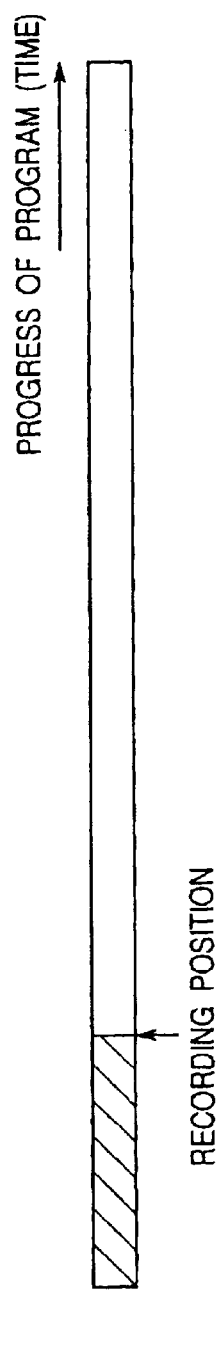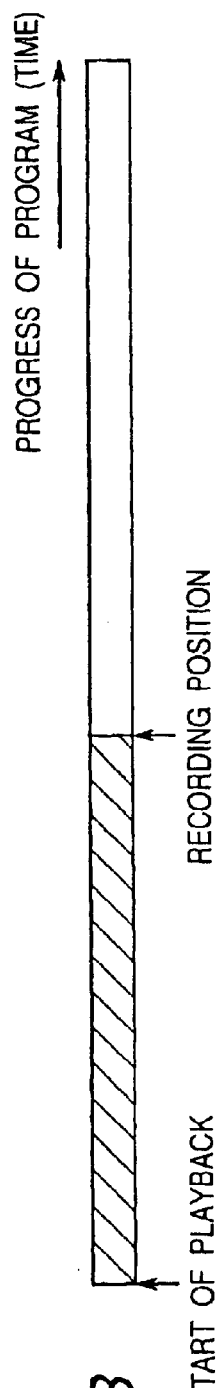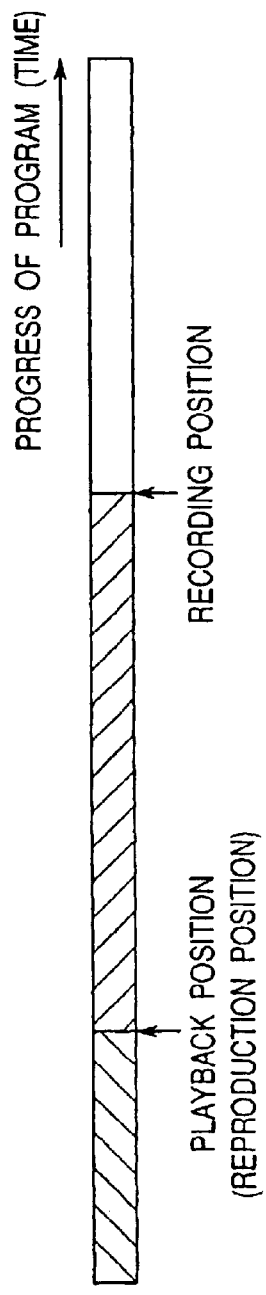

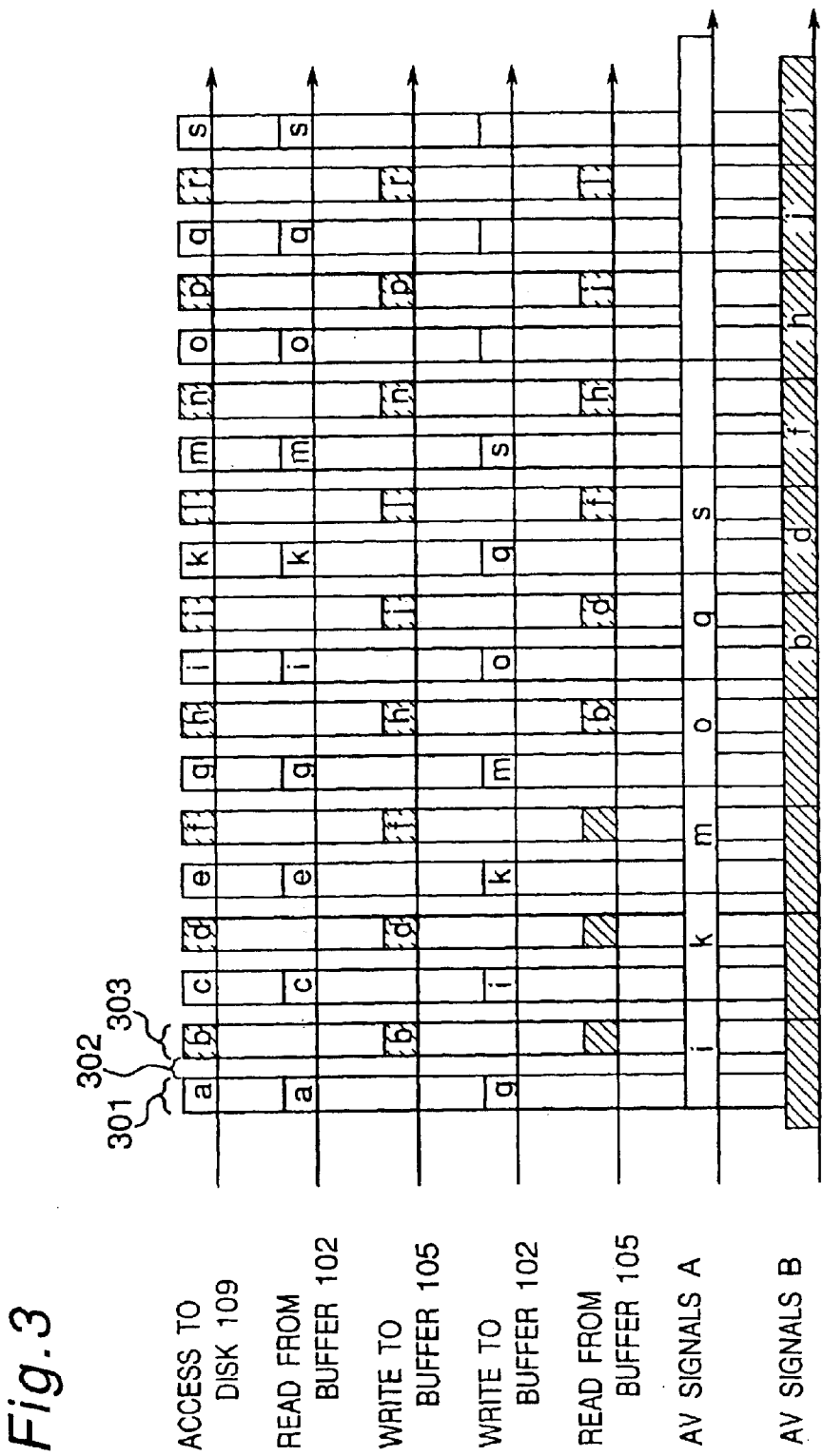

RETURN TO NORMAL PLAYBACK BECAUSE PLAYBACK POSITION CATCHES UP TO RECORDING POSITION

1301

Fig.20A DATA STREAM OF AV SIGNAL C
Fig.20B DATA STREAM OF AV SIGNAL D

SIMULTANEOUS RECORDING AND REPRODUCTION APPARATUS AND SIMULTANEOUS MULTI-CHANNEL REPRODUCTION APPARATUS

This application is a divisional application of Ser. No. 09/413,326 filed on Oct. 6, 1999 now U.S. Pat. No. 6,678,227.

BACKGROUND OF THE INVENTION

1. Field of the Invention

The present invention relates to simultaneous recording and reproduction apparatus wherein audiovisual signals are reproduced from a recording medium while they are recorded thereto.

2. Description of Prior Art

Video cassette recorders (VCR) are very popular in homes. A main use of home VCRs is reserve recording, and recording and reproduction of audiovisual signals are performed in the concept of time-shift.

However, when so-called timer recording is set in a home VCR, the contents of recording cannot be viewed, for example, before a time when the timer recording is completed. That is, the contents of recording cannot be viewed until the recording is completed. In order solve this problem, it is proposed in Japanese Patent laid open Publication 6-14288/1994 that the contents under recording can be viewed freely from the start before the reserve recording is completed. In this reproduction-while-recording, the contents from the start to a recording position can be viewed freely during the recording, and it is called as reproduction-while-recording.

On the other hand, for a DVD-RAM or the like, zone constant linear velocity control (ZCLV) is adopted. In ZCLV, a recording medium is divided in a plurality of areas (zones) in the radial direction, and constant angular velocity recording is performed in a zone. The revolution number is different among the zones, and it is faster at an inner zone. The ZCLV is used because the margin of recording power on recording is limited so that linear velocity has a value in a certain range.

However, the above prior art has the following problems. When an amount of data overflows in a buffer at the recording side, data to be recorded is missed. Further, in reproduction-while-recording, the rates of data write and read for a medium have to be faster than a case where only reproduction is performed. When the reproduction position catches the recording position in high speed reproduction or the like, a user cannot find it. A display image is disturbed when the reproduction position catches up the recording position.

In a recording medium wherein ZCLV or CLV control is used, the optimum revolution number depends on recording position. However, when reproduction-while-recording is performed for such a recording medium, the revolution number may be different between the recording and reproduction position, and it may be necessary to change the revolution number when recording operation is shifted to reproduction operation (or vice versa). When the revolution number is changed, it takes time for the revolution number to become stable. Thus, it takes time when the recording operation is shifted to the reproduction operation or vice versa. In order to increase the data rate so that the reproduction-while-recording is allowed, the time for the shift has to be shortened as much as possible. Therefore, when it is needed to change the revolution number when the recording operation is shifted to the reproduction operation or vice versa, the data rate in reproduction-while-recording becomes smaller, and it may cause the deterioration of image or sound quality, for example, when audiovisual signals are encoded and recorded.

SUMMARY OF THE INVENTION

An object of the present invention is to provide a simultaneous recording and reproduction apparatus wherein an amount of data in a buffer for recording does not overflow.

Another object of the present invention is to provide a simultaneous recording and reproduction apparatus wherein the data transmission rate for the recording medium does not become high even in reproduction-while-recording.

A further object of the present invention is to provide a simultaneous recording and reproduction apparatus wherein a user can note that the reproduction position catches up the recording position in reproduction-while-recording.

A different object of the present invention is to provide a simultaneous recording and reproduction apparatus wherein a display image does not become abnormal even when the reproduction position catches up the recording position in reproduction-while-recording.

A still different object of the present invention is to provide a simultaneous multi-channel reproduction apparatus and simultaneous recording and reproduction apparatus wherein recording and reproduction can be performed at a high data rate when simultaneous recording and reproduction or simultaneous multi-channel reproduction is performed for a recording medium recorded with ZCLV or CLV control.

In a first aspect of the invention, in a simultaneous recording and reproduction, a first buffer memory accumulates a first data stream, a data input device sends the first data stream to the first buffer memory, and a data recorder records the first data stream read from the first buffer memory to a recording medium. On the other hand, a data reproducer which reproduces the first data stream, which has been recorded previously to the recording medium, as a second data stream, a second buffer memory accumulates the second data stream read from the data reproducer, and a data output device which read the second data stream from the second buffer memory. While monitoring an amount of data accumulated in the first buffer memory, a system controller controls the data recorder and the data reproducer to perform recording and reproduction alternately in time, and when an accumulated amount of data in the first buffer memory exceeds a first predetermined-value, the system controller makes the data reproducer stop the reading of the second data stream from the recording medium temporarily and makes the data recorder write the first data stream continuously to the recording medium.

In a second aspect of the invention, in a simultaneous recording and reproduction apparatus, an encoder encodes first input signals to provide a first data stream, a first buffer memory accumulates the first data stream encoded by the encoder, and a data recorder records the first data stream read from the first buffer memory to a recording medium. A data reproducer reads the first data stream which has been recorded previously to the recording medium as a second data stream, a second buffer memory accumulates the second data stream read from the data reproducer, a decoder reads the second data stream from the second buffer memory and encodes it as second signals, and a system controller sets coding rate for the first signals in the encoder. The system controller controls the data recorder and the data reproducer to perform recording and reproduction alternately in time. When the simultaneous recording and reproduction mode is set wherein recording of the first signals and reproduction of the second signals are performed at the same time, and the system controller sets the coding rate in the encoder to be smaller than that in the normal recording mode wherein only the first signals are recorded.

In a third aspect of the invention, in a simultaneous recording and reproduction apparatus, a system controller, which sets coding rate for the first signals in the encoder, controls the data recorder and the data reproducer to perform recording and reproduction alternately in time. Further, when the simultaneous recording and reproduction mode is set wherein recording of the first signals and reproduction of the second signals are performed at the same time, the system controller sets the coding rate in the encoder so that a sum of recording rate and reproduction rate in a predetermined period is smaller than a predetermined bit rate.

In a fourth aspect of the invention, in a simultaneous recording and reproduction apparatus, a system controller, which sets the coding rate for the first signals in the encoder, controls the data recorder and the data reproducer to perform recording and reproduction alternately in time, and an encoder, which encodes first input signals to provide a first data stream, performs encoding at a variable bit rate and decreases the bit rate for encoding when the first buffer memory is going to overflow.

In a fifth aspect of the invention, in a simultaneous recording and reproduction apparatus, a system controller which monitors recording position of the first data stream to the recording medium and reproduction position of the second data stream from the recording medium, and when the reproduction position catches up with the recording position within a predetermined time, the system controller changes reading of the second data stream by the data reproducer from the recording medium to normal reading mode, or stop mode or temporal stop mode of the reading.

In a sixth aspect of the invention, in a simultaneous recording and reproduction apparatus, a system controller controls the data recorder and the data reproducer to perform recording and reproduction to the recording medium alternately in time. The system controller monitors the recording position of a first data stream to the recording medium and keeps the revolution number which is determined by the recording position of the first data stream while recording or reproduction is performed.

In a seventh aspect of the invention, in a simultaneous recording and reproduction apparatus, a system controller monitors the recording position of a first data stream to a recording medium to control the revolution number of a motor. The system controller controls the data recorder and the data reproducer to perform recording and reproduction to the recording medium alternately in time, and keeps the revolution number which is determined by the recording position of the first data stream while recording or reproduction is performed. The encoder encodes the first signals at a data rate smaller than the maximum data rate realized when data is read at a first recording position where the revolution number for the recording medium becomes a maximum by using a second revolution number most suitable for a second recording position where the revolution number for the recording medium becomes a minimum.

In an eighth aspect of the invention, a simultaneous multi-channel reproduction apparatus, used for a recording medium wherein an optimum revolution number of recording depends on reproduction position and at least two data streams are recorded. The simultaneous multi-channel reproduction apparatus comprises a motor which rotates the recording medium, a data reproducer which reads the data streams alternately in time from the recording medium, a system controller which monitors a reproduction position of the data streams on the recording medium by the data reproducer and keeps a revolution number of the motor during the reproduction by the data reproducer at a revolution number used for reproducing the data stream recorded at an inner position on the recording medium.

An advantage of the invention is that overflow and underflow in buffers for recording and for reproduction is prevented in simultaneous recording and reproduction.

Another advantage of the invention is that recording and reproduction can be performed at a high data rate in simultaneous recording and reproduction and the like.

BRIEF DESCRIPTION OF THE DRAWINGS

These and other objects present invention will become clear from the following description taken in conjunction with the preferred embodiments thereof with reference to the accompanying drawings, and in which:

FIGS. 2A, 2B and 2C are schematic diagrams for explaining a concept of reproduction-while-recording in the first embodiment of the invention;

FIG. 3 is a schematic diagram of data flow in reproduction-while-recording in the first embodiment of the invention;

FIGS. 20A and 20B are schematic diagrams on data streams in simultaneous multi-channel reproduction.

DETAILED DESCRIPTION OF THE PREFERRED EMBODIMENTS

Figure 1:
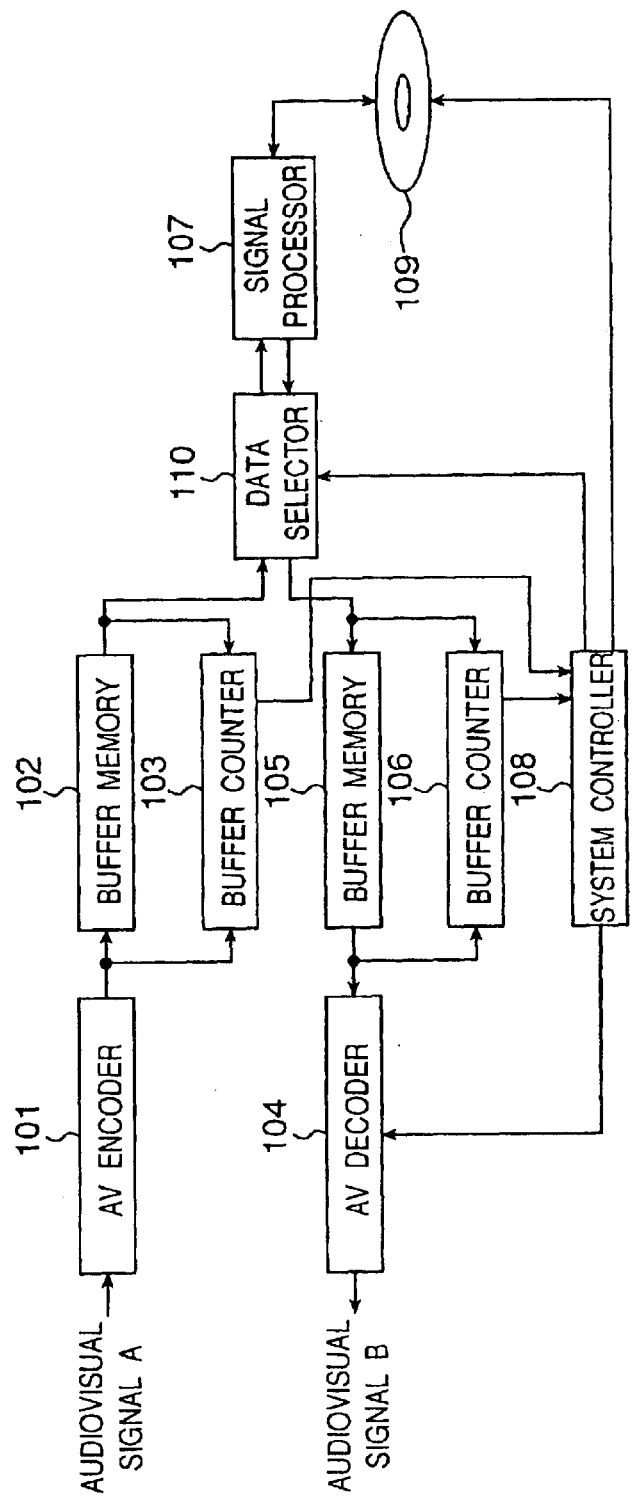
FIG. 1 is a block diagram of an apparatus which records and reproduces data at the same time according to a first embodiment of the invention.

Referring now to the drawings, wherein like reference characters designate like or corresponding parts throughout the several views, FIG. 1 shows a simultaneous recording and reproduction apparatus according to a first embodiment of the invention. The simultaneous recording and reproduction apparatus comprises an audiovisual (AV) encoder 101, buffer memories 102 and 105, buffer counters 103 and 106, an audiovisual (AV) decoder 104, a recording and reproduction signal processor 107, a system controller 108, an optical disk 109 and a data selector 110.

Next, a normal operation of the simultaneous recording and reproduction apparatus is explained. First, recording is explained. Audiovisual signals "A" are encoded by the AV encoder 101 to provide a data stream. For example, if the AV encoder 101 is an MPEG (Moving Picture Expert Group) encoder, it generates an image data stream by MPEG encoding on visual signals in the audiovisual signals "A" and an audio data stream by MPEG or AC-3 encoding on audio signals therein. Then, it multiplexes the two data streams as an MPEG system data stream to be outputted. The data stream outputted from the encoder 101 is accumulated in the first buffer memory 102. The data stream accumulated in the first buffer memory 102 is read by the data selector 110 to be inputted to the recording and reproduction signal processor 107. Then, it is subjected to error correction code (ECC) processing, modulation and the like and recorded in the optical disk 109 as a recording medium. The first counter 103 counts an amount of data to be inputted to and outputted from the first buffer memory 102 to obtain an amount of the data accumulated in the first buffer memory 102.

Next, reproduction is explained. Signals read from the optical disk 109 are processed by the signal processor 107 on binarization, demodulation, error correction code processing and the like to become a data stream, which is sent through the data selector 110 to the second buffer memory 105. The data stream read from the second buffer memory 105 is decoded by the audiovisual decoder 104 to provide audiovisual signals "B". The second counter 106 counts an amount of data to be inputted to and outputted from the second buffer memory 105 to obtain an amount of the data accumulated in the second buffer memory 105.

The system controller 108 controls change-over between the reproducing operation and the recording operation. It controls to reproduce data or record data according to whether the reproducing operation or the recording operation is selected. Further, it controls the data selector 110 so that data are streamed from the first buffer memory 102 to the signal processor 107 on recording and from the signal processor 107 to the buffer memory 105 on reproduction.

Next, reproduction-while-recording in the simultaneous recording and reproduction apparatus shown in FIG. 1 is explained. FIGS. 2A–2C show schematically the concept of reproduction-while-recording, wherein recording and reproduction situations are illustrated when a program is reproduced after recording. First, as shown in FIG. 2A, recording of a program is started. A portion with hatching in FIG. 2A shows that the program is recorded in an optical disk. As shown in FIG. 2B, after recording is performed for a certain time, reproduction is started from the top of the program. Even when the reproduction is started, the recording of the program is continued. FIG. 2C shows a situation when a certain time elapses after the reproduction is started. A portion up to the reproduction position (playback position) has already been reproduced. Thus, recording and reproduction are performed on the optical disk 109 simultaneously in time-sharing.

With reference to FIG. 3, the operation of the simultaneous recording and reproduction apparatus is explained in the situation shown in FIG. 2C. FIG. 3 shows schematically time change in access to the optical disk 109, data read from and data write to the buffer memories 102, 105, and the audiovisual signals "A" and "B". The same marks represent the same data of the same encoded or decoded data. FIG. 3 shows an example wherein a data amount to be read from and written to the buffer 102, 105 or the disk 109 is the same. The access to the optical disk 109 is performed alternately for read and for write (refer to "access to disk 109" in FIG. 3). The data with hatching represent data reproduced from the optical disk 109, while the data without hatching represent data recorded to the optical disk 109. For example, data "a" is recorded at time 301. Then, at time 302, a reproduction position of data "b" is, searched, and the data "b" is reproduced at time 303.

Figure 4:
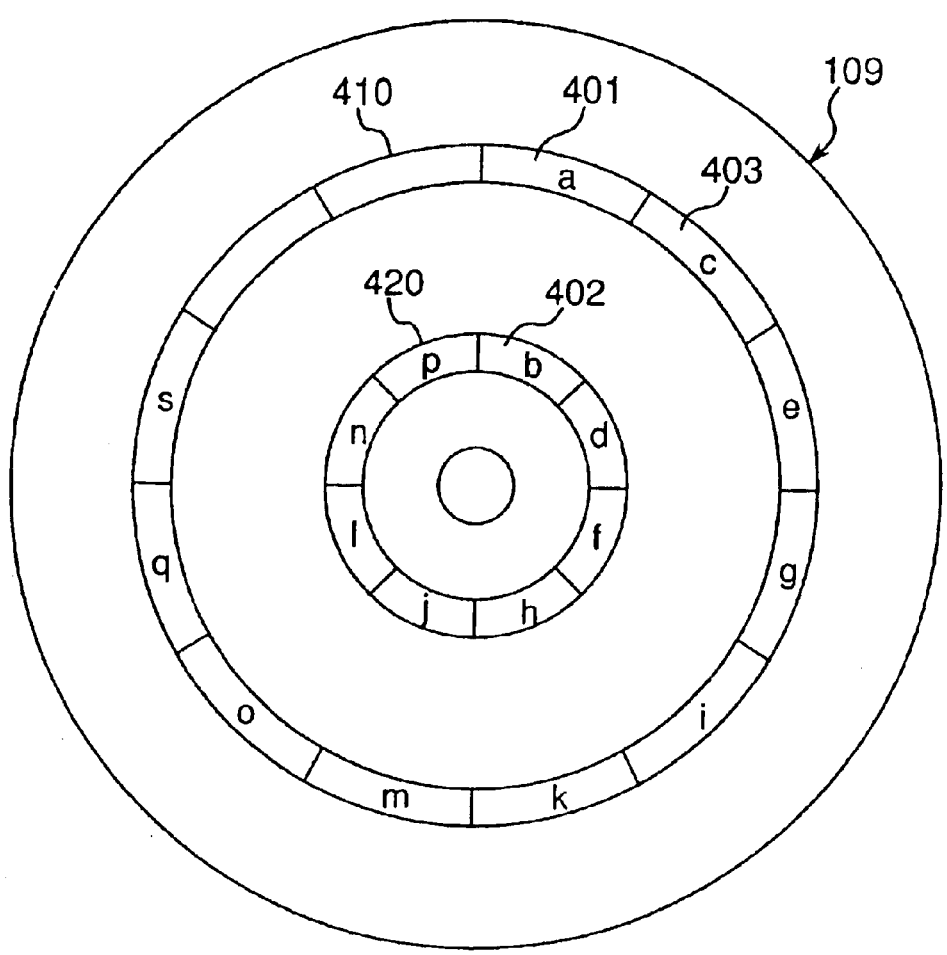
FIG. 4 is a schematic diagram on recording position on an optical disk in the first embodiment of the invention.

Next, normal operation in the simultaneous recording and reproduction apparatus is explained with reference to FIG. 4. FIG. 4 shows tracks in the optical disk 109 and arrangement of recorded data. Now data are recorded in continuous tracks. In track 410, data "a", "c", "e", "g", "i", "k", "m", "o", "q", "s" while in track 420, data "b", "d", "f", "h", "j", "l", "n", "p" are recorded. In this case, after the data "a" are recorded in a region 401, the top of a region 402 is searched, and the data "b" is reproduced from the region 402. After the data "b" is reproduced, the top of a region 403 is searched, and the data "c" is recorded to the region 403. The region is, for example, a sector, an ECC blocks or ECC block.

The data "i", "k", "m" and the like recorded in the optical disk 109 are written to the first buffer memory 102 after being received as the audiovisual signal "A" as shown in FIG. 3 and encoded by the encoder 101. The timings are shown as "write to buffer 102" in FIG. 3. The data written at the timings are accumulated in the first buffer 102 for a certain time. Then, they are read from the first buffer memory 102, as shown as "read from buffer 102" in FIG. 3, and recorded to the optical disk at the timings shown as "access to disk 109" in FIG. 3.

The data "b", "d", "f" and the like reproduced from the optical disk 109 are read as shown as "access to disk 109" in FIG. 3. Then, they are written to the second buffer memory 105 as shown as "write to buffer 105" in FIG. 3. The data written at the timings as shown as "write to buffer 105" in FIG. 3 are accumulated in the second buffer 105 for a certain time. Then, they are read from the second buffer memory 105 at timings as shown as "read from buffer 105" in FIG. 3 and reproduced at timings shown as "audiovisual signal B" in FIG. 3.

Figure 5:
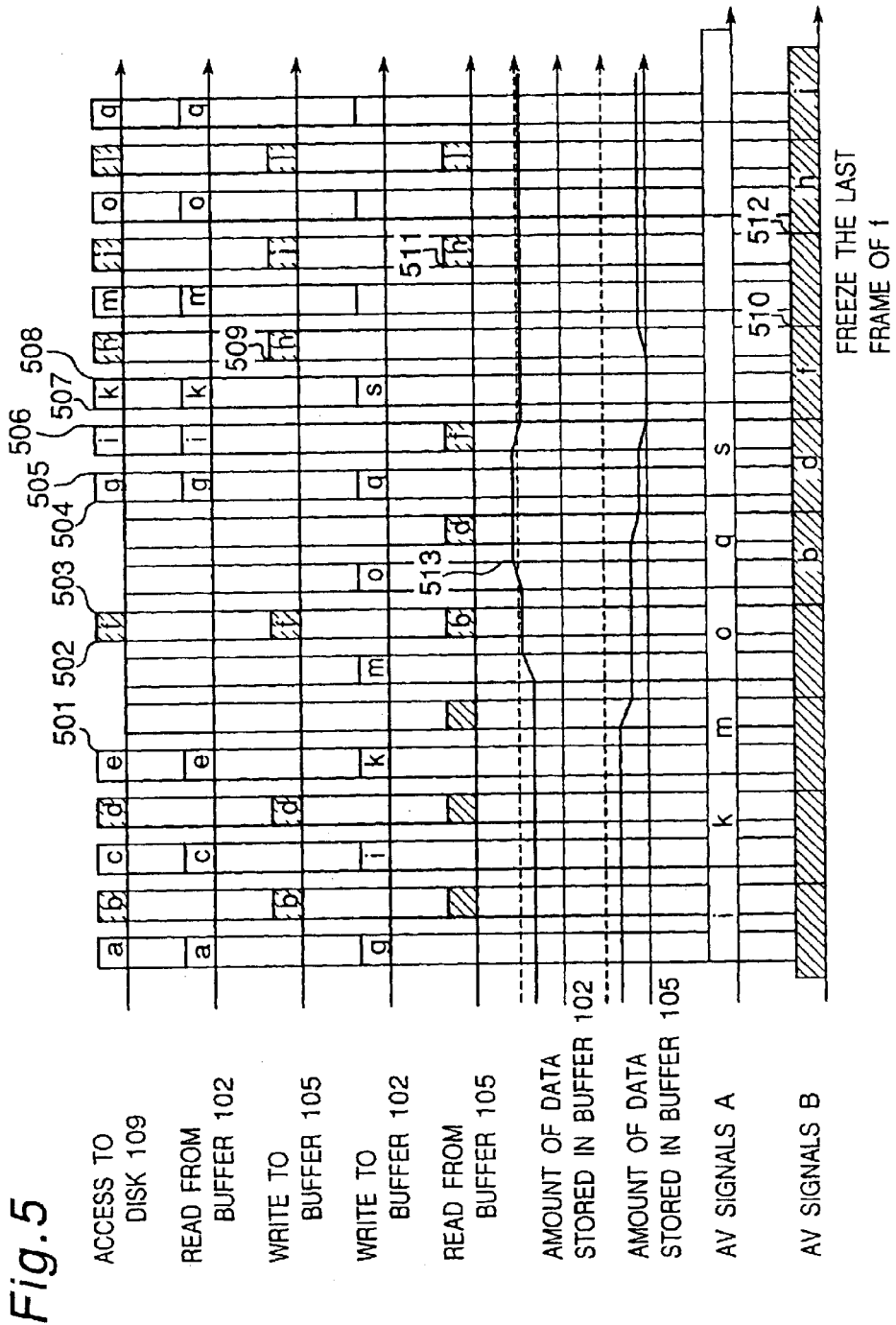
FIG. 5 is another schematic diagram of data flow in reproduction-while-recording in the first embodiment of the invention.

In a situation as shown in FIG. 5, a search for disk access takes a longer time than usual, and the first buffer 102 is going to overflow. In this example, a longer time than usual is needed after data "e" is written to the disk 109 at time 501 and until the search of reproduction position for data "f" is completed at time 502. Further, a longer time than usual is also needed after data "f" are read at time 503 from the optical disk 109 and until the search of recording position for data "g" is completed at time 504. As explained below, in such a case, priority is given to recording rather than reproduction. That is, when the buffer for recording is going to overflow, the reproduction from the optical disk is stopped, and recording is performed continuously.

The audiovisual signal "A" is inputted continuously as shown as "amount of data in buffer 105" in FIG. 5. Therefore, data write to the first buffer memory 102 is performed as usual as shown as "write to buffer 102" in FIG. 5. However, as shown as "read from buffer 102" in FIG. 5, an amount of data read from the first buffer 102 becomes smaller in correspondence to the extra time used for the search in the optical disk 109. Therefore, an amount of data accumulated in the first buffer memory 102 becomes larger than usual, as shown as "amount of data stored in buffer 102" in FIG. 5. At time 513 when the data "o" is recorded to the first buffer 102, the amount of data accumulated in the first buffer 102 exceeds a first predetermined value (dashed line). When the amount of data accumulated in the first buffer 102 exceeds a first predetermined value, the first buffer counter 103 notifies the system controller 108 of this. When the first buffer counter 103 notifies that the amount of data accumulated in the first buffer memory 102 exceeds the first predetermined value, the system controller 108 stops the reproduction from the optical disk temporarily and performs recording to the optical disk 109 with priority until the amount of data accumulated in the first buffer memory 102 decreases to or below a second predetermined value. In this example, the second predetermined value is the same as the first one. Thus, after data "g" is recorded at time 504 (until time 505), the amount of data accumulated in the first buffer memory 102 is checked. At this time, as shown as "amount of data stored in buffer 102" in FIG. 5, because the amount of data accumulated in the first buffer memory 102 exceeds the second predetermined value, the data "i" is recorded successively to the optical disk 109. When the recording of the data "i" is completed (time 506), the amount of data stored in the first buffer 102 becomes smaller than the second predetermined value. As the data are written to the first buffer memory 102, data "k" is written successively to the optical disk 109. Then, when the recording of the data "k" to the optical disk 109 is completed (time 508), the amount of data accumulated in the first buffer memory 102 is smaller than the second predetermined value. Then, the top position of next data "h" is searched in order to read the data "h" from the optical disk 109.

On the other hand, at time 506, the amount of data accumulated in the buffer memory 105 becomes zero. Read from the buffer memory 105 is performed usually at time 509. However, because the amount of data is zero, data are not read from the buffer memory 105. Then at time 510, there is no audiovisual signal B to be outputted from the decoder 104. Then, the decoder 104 freezes and outputs the last frame of the image "f" from time 510 to time 512. At time 511, data "h" are read from the buffer memory 105, and at time 512, the decoder 104 can prepare audiovisual signal "B" and output the data "h" as audiovisual signal "B".

As explained above, the simultaneous recording and reproduction apparatus of the embodiment records audiovisual signals of a program to a recording medium. After a certain time elapses, it reproduces audiovisual signals which have already been recorded while continuing the recording. That is, reproduction-while-recording is performed. In the simultaneous recording and reproduction or reproduction-while-recording, the amounts of data in the buffers on the recording side and on the reproduction side are monitored. When the amount of data in the buffer on the recording side exceeds the first predetermined value, the reproduction is stopped temporarily and the recording is performed continuously thereafter. Then, when the amount of data in the buffer on the recording side decreased to or below the second predetermined value, the reproduction and the recording are performed alternately again. Then, recording of data to a recording medium can be assured even when the amount of data in the recording side becomes large by a longer seek time needed between the recording and the reproduction.

FIG. 4 shows an example where data which are continuous in time are recorded in continuous regions. However, the recording position of the data may not necessarily be in continuous regions.

In this embodiment, the amounts of data to be read from or written to the buffer memories and the optical disk are the same. However, the amount of data may be different in each of the read and write operations. Further, the amount of data to be accessed at once on read from or write to the buffer memories may be different from that for the optical disk. Further, the amount of data to be accessed at once on read from the buffer memories or the optical disk may be different from the counterpart on write thereto.

The first and second buffer memories 102 and 105 may be composed of a single memory. For example, the memory is used on reproduction from the top in the memory space and on recording from the last therein.

In this embodiment, it is explained that the amount of data accumulated in the buffer memory 102 exceeds the predetermined value due to slow search. However, the simultaneous recording and reproduction apparatus of this embodiment can also be used when the amount of data accumulated in the buffer memory 102 exceeds the predetermined value due to other causes. For example, when recording and reproduction are performed at a variable bit rate, the amount of data accumulated in the buffer memory 102 may exceed the predetermined value if a sum of the bit rate for reproduction and that for recording exceeds a predetermined bit rate. Such a situation also occurs, for example, when learning is performed on recording and reproduction conditions when a defective sector exists in the recording medium, or when data are written to a file management area (table-of-contents area). Learning optimizes the parameters for the servo and focus in the apparatus during recording. For example, the learning for focusing is needed when a temperature difference arises in the apparatus as time elapses. On learning, the recording and the reproduction for the real data are stopped. Then, it is liable that the buffer on the recording side overflows. A defective sector is detected, for example, when a sector address cannot be read. When a defective sector is detected, for example, the sector is skipped and recording is performed in a next sector or in an alternate sector. Then, the recording is stopped temporarily, and it is liable that the buffer on the recording side overflows. File management data on data recorded in the recording medium are stored usually in a memory in the system controller. The management data on data recorded in the recording medium are recorded to the disk after all the data (for example data of a program) are recorded. However, there is a system where the file management data are managed in a disk after a certain time elapses or a certain amount of data are recorded. In such a case, while the file management data are recorded, the recording and reproduction of audiovisual data are stopped. Then it is liable that the buffer on the recording side overflows.

In the embodiment, the first predetermined value for the amount of data accumulated in the first buffer memory 102 when the reproduction from the optical disk 109 is stopped temporarily is the same as the second predetermined value when the reproduction from the optical disk 109 is restarted. However, these values may be different from each other.

In a modified embodiment, in order to prevent underflow in the second buffer memory 105 for reproduction, the system controller 108 stops read of the second data stream from the second buffer memory 105 when the amount of data accumulated in the second buffer memory 105 by the decoder 104 is decreased to or below a third predetermined value. Next, the system controller 108 starts read of the second data stream from the second buffer memory 105 when the amount of data accumulated in the second buffer memory 105 is decreases to a value equal to or smaller than the third predetermined value and is increased to a value equal to or larger than a fourth predetermined value. The third predetermined value may be the same as or different from the fourth one.

Figure 6:
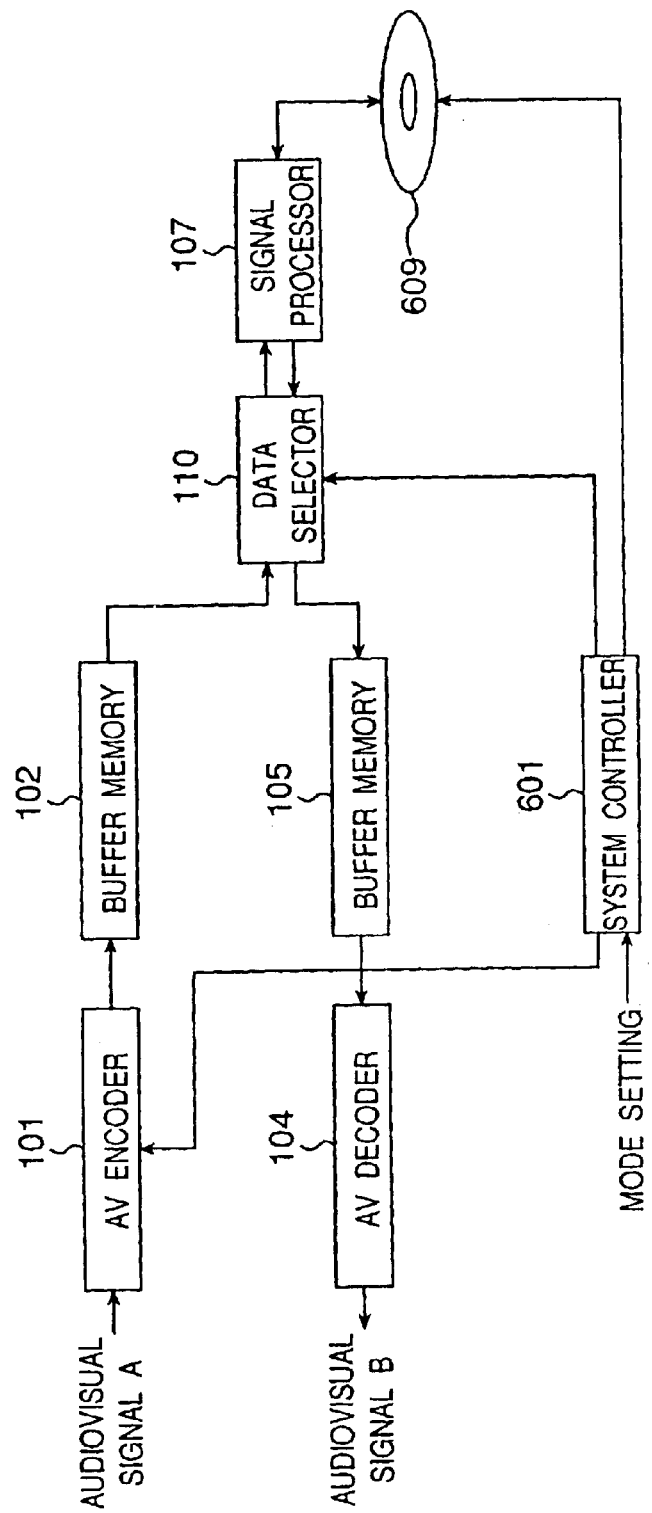
FIG. 6 is a block diagram of an apparatus which records and reproduces data at the same time according to a second embodiment of the invention.

FIG. 6 shows a simultaneous recording and reproduction apparatus according to a second embodiment of the invention. The simultaneous recording and reproduction apparatus comprises an audiovisual (AV) encoder 101, buffer memories 102 and 105, an audiovisual (AV) decoder 104, a recording and reproduction signal processor 107, a system controller 601, an optical disk 609 and a data selector 110. This apparatus is different from the counterpart in the first embodiment in that counters for the buffer memories 102 and 105 are not provided. The apparatus can change coding rate. For example, in a case that recording and reproduction are performed at a variable bit rate, when a sum of the bit rate for reproduction and that for recording exceeds a predetermined bit rate, an amount of data accumulated in a buffer memory exceeds a predetermined value. Then, as will be explained later, when the buffer for recording almost overflows, the system controller 601 decreases the bit rate for encoding on simultaneous recording and reproduction.

Figure 7:
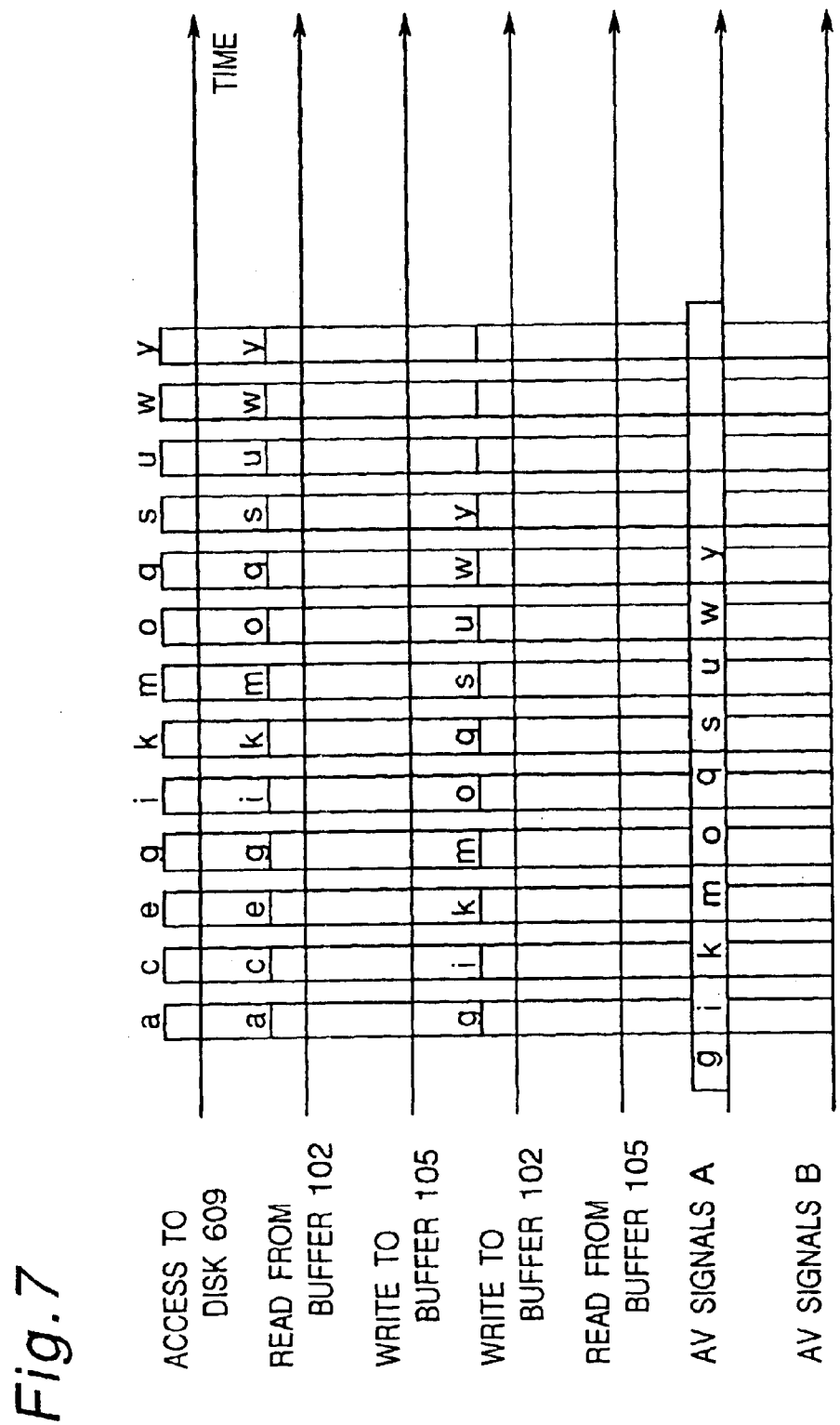
FIG. 7 is a schematic diagram of data flow in reproduction-while-recording in the second embodiment of the invention.

The basic operation of the simultaneous recording and reproduction apparatus is the same as the normal operation of the apparatus of the first embodiment. An operation-mode is set to the system controller 601. Usually there are two operation modes: Normal recording mode and simultaneous recording and reproduction mode (reproduction-while-recording mode). The normal recording mode is explained with reference to FIG. 7. FIG. 7 shows, schematically, the time change in access to the optical disk 609, data read from and data write to the buffer memory 102, and the audiovisual signal "A". In the normal recording mode, reproduction is not performed. The same marks represent the same data of the same encoded or decoded data FIG. 7 shows an example wherein a data amount to be read from and written to the buffer 102, 105 or the disk 609 is the same. The data "i", "k", "m" and the like recorded in the optical disk 609 are written to the first buffer memory 102 after being received as the audiovisual signal "A" as shown in FIG. 7 and encoded by the encoder 101. The timings are shown as "write to buffer 102" in FIG. 7. The data written at the timings are accumulated in the first buffer 102 for a certain time. Then, they are read from the first buffer memory 102, as shown as "read from buffer 102" in FIG. 7, and recorded to the optical disk 609 at the timings shown as "access to disk 609" in FIG. 7.

Figure 8:
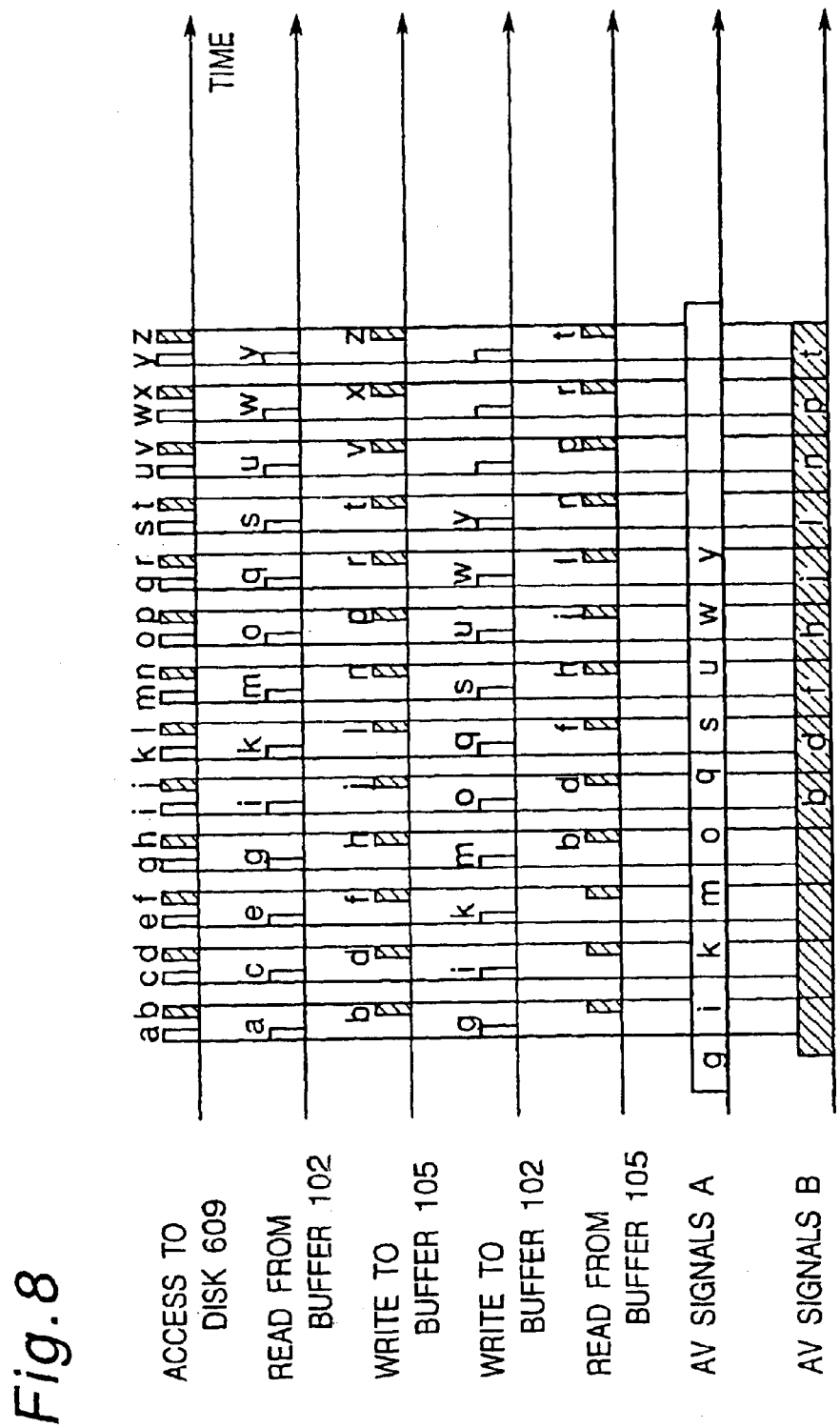
FIG. 8 is another schematic diagram of data flow in reproduction-while-recording in the second embodiment of the invention.

Next, operation in the reproduction-while-recording mode is explained with reference to FIG. 8. When the reproduction-while-recording mode is set, the coding rate for encoding by the encoder 101 on audiovisual signals is set so that a time length of audiovisual signals can be recorded and reproduced in the reproduction-while-recording mode in the same period as the same time length of audiovisual signals in the normal recording mode. FIG. 8 shows, schematically, the time change in access to the optical disk 609, data read from and data write to the buffer memories 102, 105, and the audiovisual signals "A" and "B". The same marks in FIGS. 7 and 8 represent the same data of the same encoded or decoded data. FIG. 8 shows an example wherein a data amount to be read from and written to the buffer 102, 105 or the disk 609 is the same. When the reproduction-while-recording mode is set, the system controller 601 set a coding rate to be lower than that in the normal recording mode to the encoder 101. In FIG. 8, the amount of bits per time is the same. As will be understood by comparing FIG. 8 with FIG. 7, the bit rate for encoding by the encoder 101 is low. It is also found that when a time length of audiovisual signals are recorded in the normal recording mode, the same time length of audiovisual signals are recorded and reproduced in the reproduction-while-recording mode. For example, the encoding rate in the reproduction-while-recording mode may be set to be equal to or smaller than half of the counterpart in the normal recording mode.

The access to the optical disk 609 is performed alternately for read and for write (refer to "access to disk 609" in FIG. 8). The data with hatching represent data reproduced from the optical disk 609, while the data without hatching represent data recorded to the optical disk 609. The data "i", "k", "m" and the like recorded in the optical disk 609 are written to the first buffer memory 102 after being received as the audiovisual signal "A" as shown in FIG. 8 and encoded by the encoder 101. The timings are shown as "write to buffer 102" in FIG. 8. The data written at the timings are accumulated in the first buffer 102 for a certain time. Then, they are read from the first buffer memory 102, as shown as "read from buffer 102" in FIG. 8, and recorded to the optical disk 609 at the timings shown as "access to disk 609" in FIG. 8.

Next, the read operation is explained. The data "b", "d", "f" and the like reproduced from optical disk 609 are read as shown as "access to optical disk 609" in FIG. 8. Then, they are written to the second buffer memory 105, as shown as "write to buffer 105" in FIG. 8. The data written to the buffer memory 105 at the timings are accumulated in the second buffer 105 for a certain time. Then, they are read from the buffer memory 105, as shown as "read from buffer 105" in FIG. 8, and reproduced at the timings shown as "audiovisual signal B" in FIG. 8.

Thus, when the reproduction-while-recording mode is set, reproduction-while-recording is possible without causing overflow or underflow in the buffer memories. Further, a high coding rate can be set in the normal recording mode according to the capability of the recording medium, and audio and visual signals of high quality can be obtained. On the other hand, in the reproduction-while-recording mode, recording and reproduction can be performed simultaneously without increasing the transmission rate for the recording medium.

In the embodiment, the system controller 601 sets the coding rate to the encoder 101 to be lower than that in the normal recording mode. However, in a modified example, the system controller 601 sets the same coding rate as that in the normal recording mode. When the buffer for recording is going to overflow, the system controller 108 decreases the bit rate for encoding to be lower than that in the normal recording mode in order to suppress the overflow of the buffer 102 for recording.

Next, a simultaneous recording and reproduction apparatus in a third embodiment of the invention is explained. The apparatus has the same structure as that in the second embodiment shown in FIG. 6. However, the encoder 101 performs encoding at a variable bit rate. The bit rate for encoding in the reproduction-while-reproduction mode is set so that a sum of the recording rate and the reproduction mode in a predetermined period is equal to or smaller than a predetermined bit rate. That is, the system controller 108 sets the coding rate of the encoder 101 so that a sum of the recording rate and the reproduction mode in a predetermined period is equal to or smaller than a predetermined bit rate.

Figure 9:
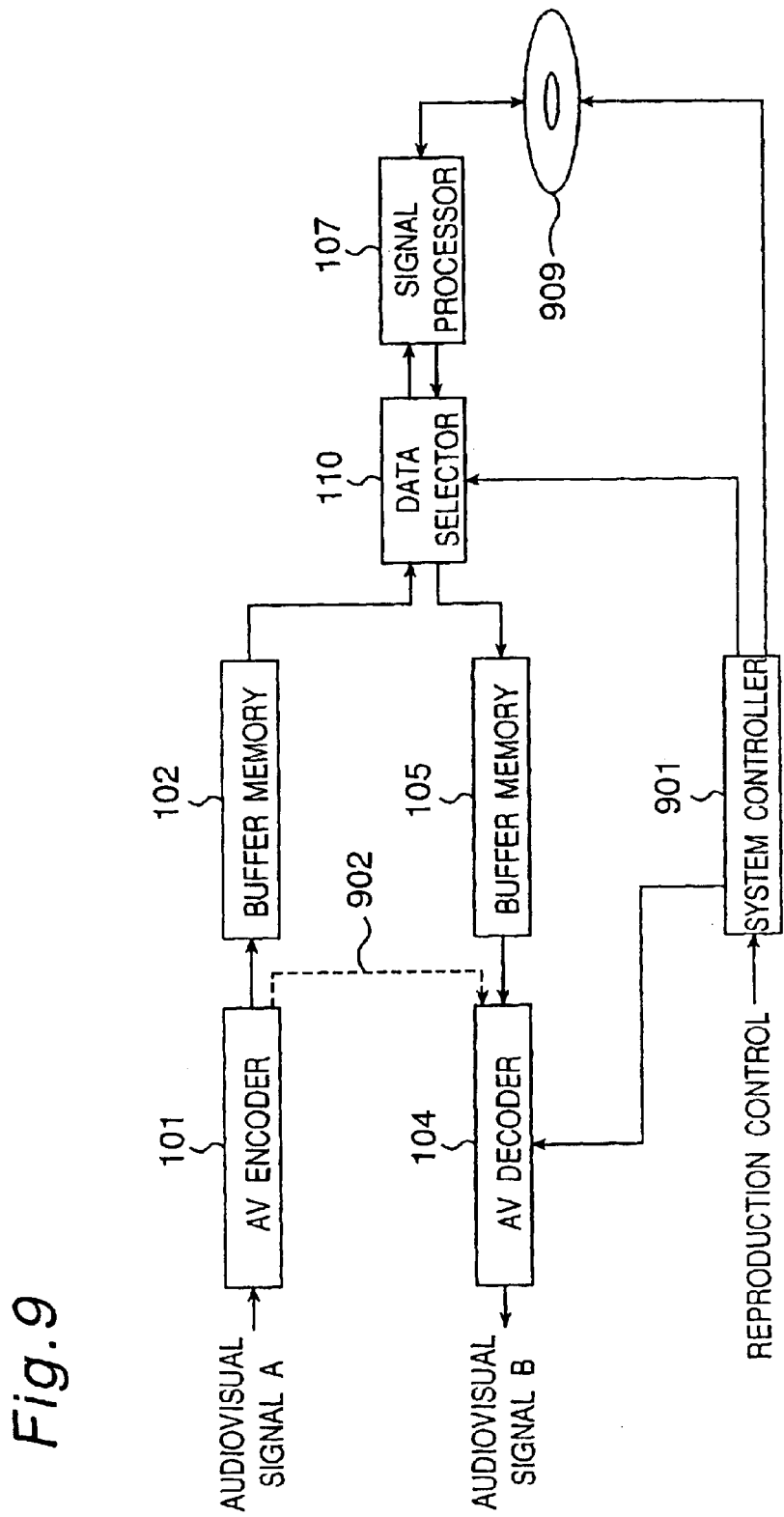
FIG. 9 is a block diagram of an apparatus which records and reproduces data at the same time according to a fourth embodiment of the invention.

FIG. 9 shows a simultaneous recording and reproduction apparatus according to a fourth embodiment of the invention. The simultaneous recording and reproduction apparatus comprises an audiovisual (AV) encoder 101, buffer memories 102 and 105, an audiovisual (AV) decoder 104, a recording and reproduction signal processor 107, a system controller 901, an optical disk 909 and a data selector 110. The simultaneous recording and reproduction apparatus is different from the counterpart of the first embodiment in a point that buffer counters are not provided. In this simultaneous recording and reproduction apparatus, as will be explained below, when a user instructs reproduction-while-recording with high speed playback, the system controller 901 changes high speed playback to normal speed playback when the buffer for recording is going to overflow.

Figure 10:
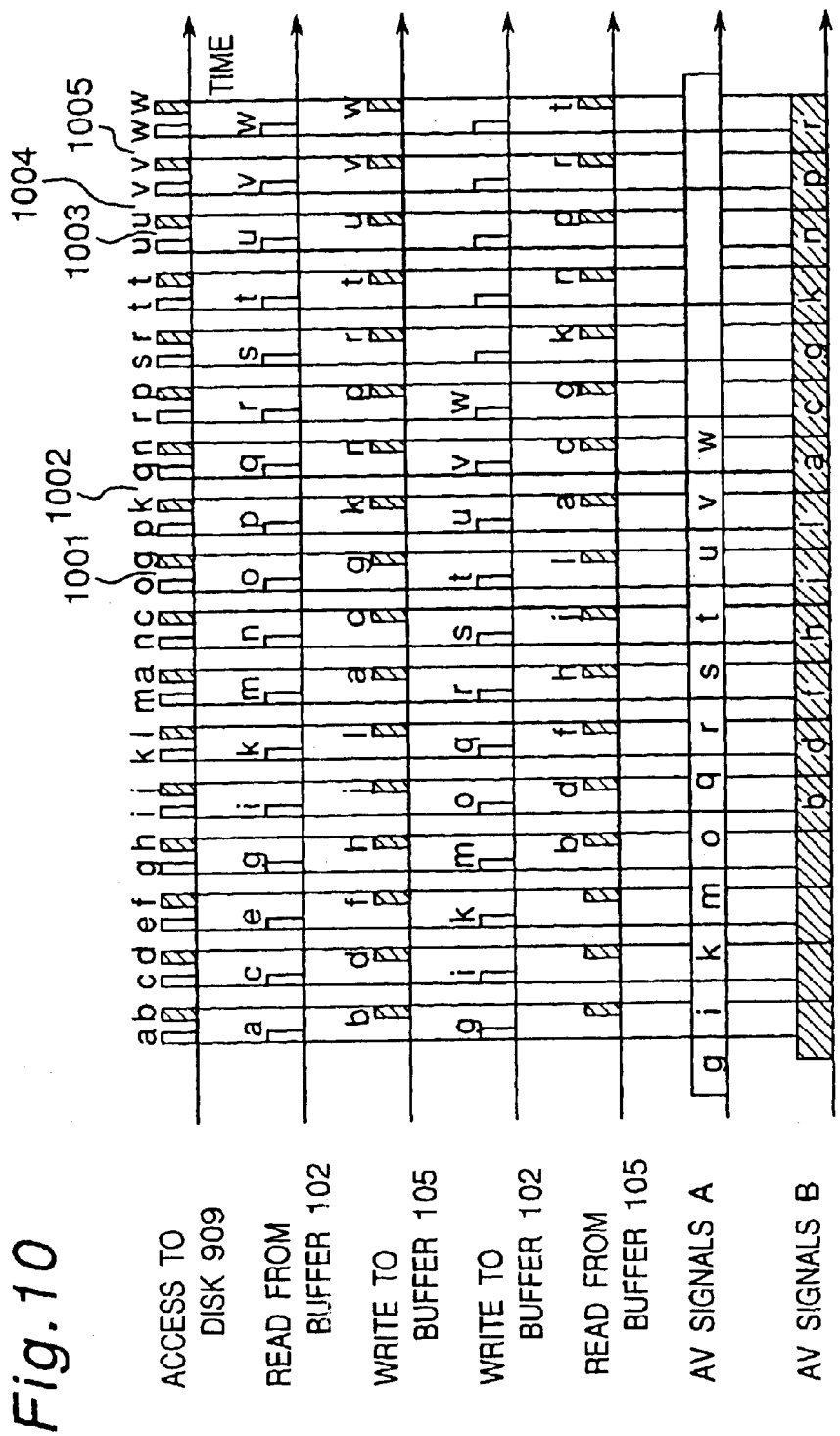
FIG. 10 is a schematic diagram of data flow in reproduction-while-recording in the third embodiment of the invention.

The basic operation in the simultaneous recording and reproduction apparatus is the same as the normal operation in the apparatus of the first embodiment. FIG. 10 shows, schematically, the time change in recording and reproduction for the optical disk 909, data read from and data write to the buffer memories 102, 105, and the audiovisual signals "A" and "B". As shown in FIG. 10, in the access to the optical disk 909, recording and reproduction are performed alternately. As to "access to the optical disk 909" in FIG. 10, the data with hatching represent data reproduced from the optical disk 909, while the data without hatching represent data recorded to the optical disk 909.

Figure 11:
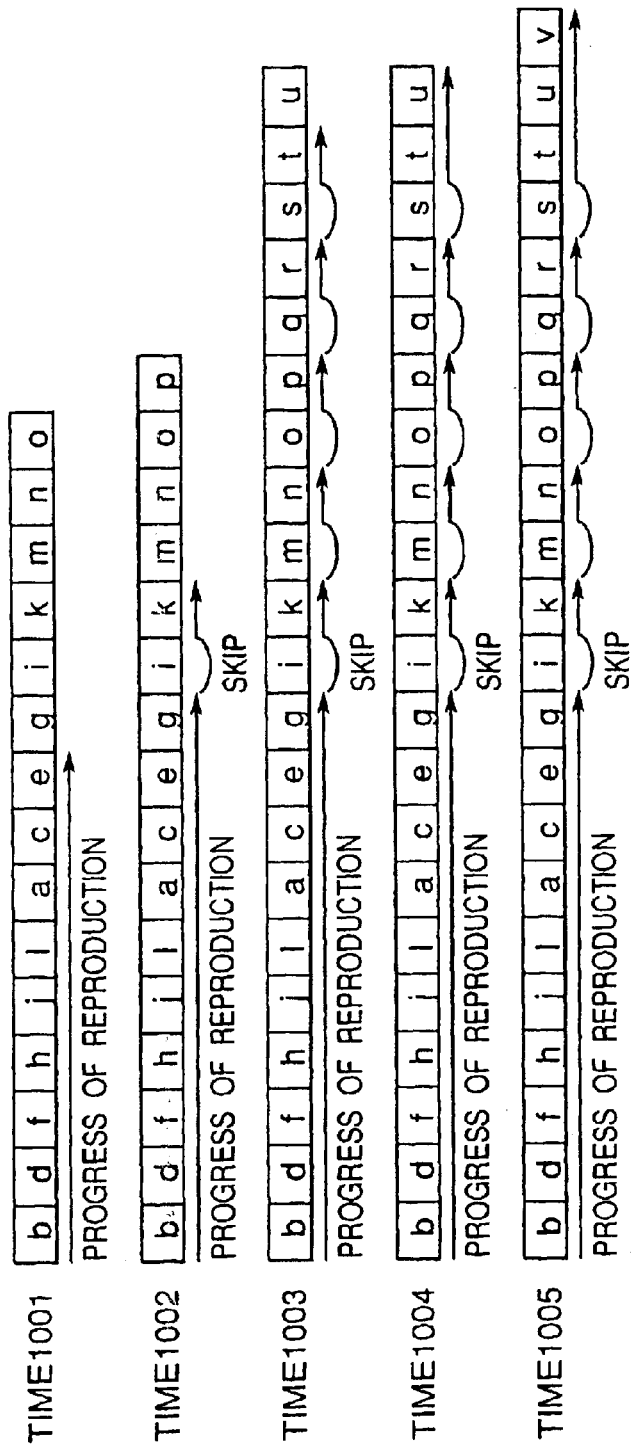
FIG. 11 is another schematic diagram of data flow in reproduction-while-recording in the third embodiment of the invention.

In FIG. 10, the simultaneous recording and reproduction apparatus performs standard simultaneous recording and reproduction (reproduction-while-recording) until time 1001. FIG. 11 shows the data recorded in the optical disk 909 and the progress of reproduction at time 1001. FIG. 11 is provided to represent the logical arrangement of data recorded in the optical disk 909 and the progress of reproduction at various times. At time 1001, data until "o" are recorded in the optical disk 909, while data until "c" in the recorded data have been reproduced.

At time 1001, high speed playback is instructed to the system controller 901. Then, the system controller 901 performs data read from the optical disk 909 for high speed playback. That is, after data "g" is reproduced, data "k" is reproduced without reproducing data "i". Further, the decoder 104 is notified that data of high speed playback is sent. FIG. 11 also shows the data recorded in the optical disk 909 and the progress of reproduction at time 1002. After time 1001, the system controller 901 performs reproduction while thinning out the data recorded in the optical disk 909.

FIG. 11 further shows the data recorded in the optical disk 909 and the progress of reproduction at time 1003. At time 1003, the reproduction has been carried out to data "t". Therefore, the next data to be reproduced is data following data "u". However, the data following data "u" has not yet been recorded at time 1003. Then, the system controller stops operation for high speed playback and changes to normal speed playback to reproduce data "u". FIG. 11 next shows the data recorded in the optical disk 909 and the progress of reproduction at time 1004. After time 1004, the system controller 901 performs normal speed playback. For example, FIG. 11 shows the data recorded in the optical disk 909 and the progress of reproduction at time 1005.

When the reproduction position catches up with the recording position, the simultaneous recording and reproduction apparatus performs the reproduction from the optical disk 909, without using an EE system. When the reproduction is performed through the EE system in the apparatus shown in FIG. 9, a system 902 is used for reproduction. However, after being changed to the normal speed reproduction, if an instruction for reproduction in the reverse direction is sent to the system controller 901 when the reproduction is performed through the EE system, the reproduction from the optical disk has to be performed again, so that the control becomes complicated. If the reproduction from the optical disk 909 is performed after the reproduction position catches up with the recording position, the change to the reverse reproduction can be performed smoothly.

As explained above, when high speed playback is performed during the simultaneous recording and reproduction and the reproduction position catches up with the recording position, the simultaneous recording and reproduction apparatus according to the embodiment changes the high speed reproduction to the normal speed reproduction so that the reproduction position will not outrun the recording position. Thus, because the reproduction position is prevented from outrunning the recording position, an image or sound is not disturbed by reproducing insignificant data.

As explained above, when reproduction and the reproduction position catches up with the recording position, the simultaneous recording and reproduction apparatus according to the embodiment performs reproduction from the optical disk, without using reproduction in the EE system. Then, when the normal speed reproduction is started after the reproduction position catches up with the recording position, even if reverse reproduction is instructed, the change to the reverse reproduction can be performed smoothly.

In this embodiment, the amounts of data to be read from or written to the buffer memories and the optical disk are the same. However, the amount of data may be different in each of the read and write. Further, the amount of data to be accessed at once on read from or write to the buffer memories may be different from that for the optical disk. Further, the amount of data to be accessed at once on read from the buffer memories or the optical disk may be different from the counterpart on write thereto.

In this embodiment, in high speed reproduction, the data are thinned at every other data unit. However, a different thinning method may be adopted.

In this embodiment, when high speed reproduction is performed in the reproduction-while-recording, the high speed reproduction is canceled to move to the normal speed reproduction if the reproduction position catches up with the recording position. However, in a different example, if the reproduction position catches up with the recording position within a predetermined time, the high speed reproduction is canceled automatically and the normal speed reproduction is started.

In this embodiment, the reproduction position catches up with the recording position due to high speed reproduction in the reproduction-while-recording. However, the apparatus according to the embodiment can also be applied when the catch-up is caused by other factors. For example, the reproduction position catches up with the recording position when the recording is interrupted or stopped. In such cases, when the reproduction position catches up with the recording position, the apparatus is moved to a temporal stop state or a stop state.

Figure 12:
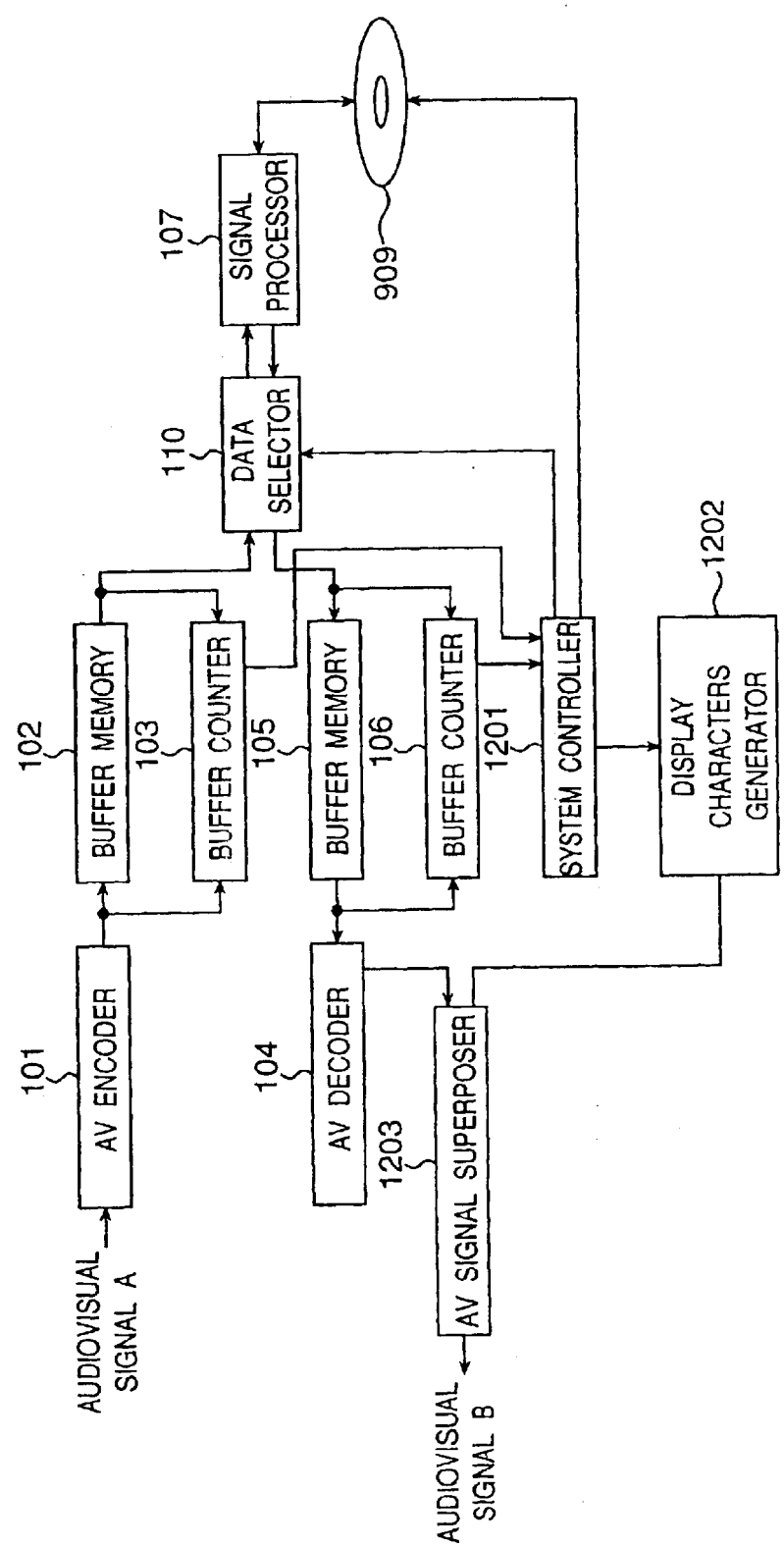
FIG. 12 is a block diagram of an apparatus which records and reproduces data at the same time according to a fifth embodiment of the invention.

FIG. 12 shows a simultaneous recording and reproduction apparatus according to a fifth embodiment of the invention. The simultaneous recording and reproduction apparatus comprises an audiovisual (AV) encoder 101, buffer memories 102 and 105, an audiovisual (AV) decoder 104, a recording and reproduction signal processor 107, a system controller 1201, an optical disk 909, a data selector 110, a display character generator 1202 and an audiovisual signal superposer 1203. When the reproduction position catches up with the recording position, for example, due to high speed reproduction in the reproduction-while-recording, the simultaneous recording and reproduction apparatus cancels the high speed reproduction and moves to the normal speed reproduction. Further, it displays a message on the shift to the normal speed reproduction on the screen. Thus, the automatic shift to the normal speed reproduction is notified to a user, and a user can understand why the operation is changed automatically from the high speed reproduction to normal speed operation. Thus, a user-friendly interface can be provided.

The operation of reproduction-while-recording in the simultaneous recording and reproduction apparatus is similar to that in the third embodiment. That is, when high speed reproduction is performed in the reproduction-while-recording, the high speed reproduction is canceled to adopt the normal speed reproduction if the reproduction position catches up with the recording position.

Figure 13:
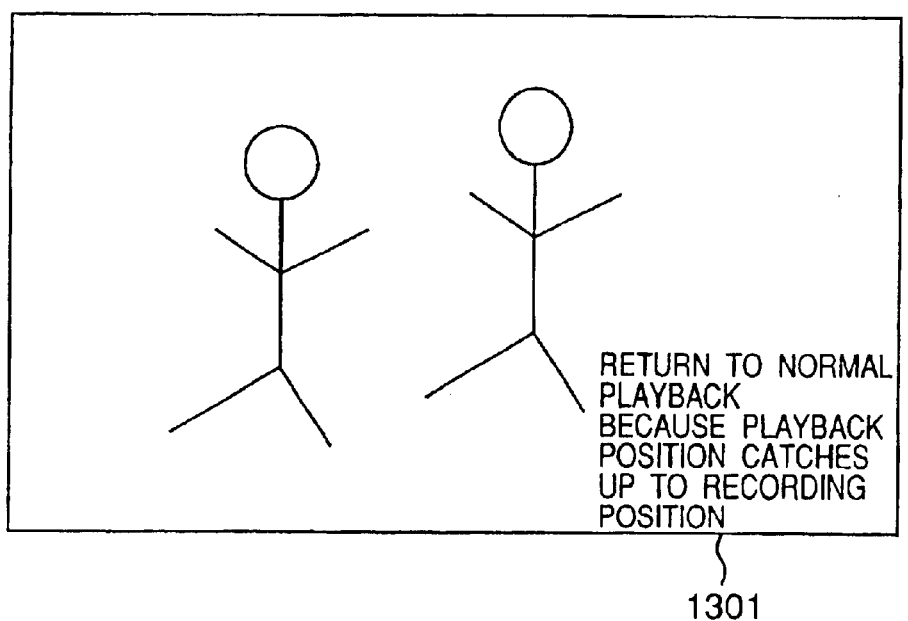
FIG. 13 is a schematic diagram of an example of a display in a fifth embodiment of the invention.

Next, the operation when the reproduction position catches up with the recording position is explained. When the system controller 1201 detects that the reproduction position catches up with the recording position at time 1001 in FIG. 10, it notifies the display character generator 1202 that the reproduction position catches up with the recording position. When the display character generator 1202 receives the notification, it generates character data for notifying that the reproduction position catches up with the recording position and outputs the character data to the visual image superposer 1203. The visual image superposer 1203 superposes the character data received from the display character generator 1202 with the audiovisual signals received from the decoder 104 to output audiovisual signal "B". FIG. 13 shows an example of character display. A message 1301 is superposed with the image.

In this embodiment, the display character generator 1202 generates characters. However, marks, icons and the like may also be used instead of character data.

In the above-mentioned embodiments, an optical disk is used as a recording medium. However, the invention can be applied to a different recording medium such as a magnetic disk.

In the above-mentioned embodiments, the amounts of data to be read from or written to the buffer memories and the optical disk are the same. However, the amount of data may be different in each of the read and write operations. Further, the amount of data to be accessed at once on read from or write to the buffer memories may be different from that for the optical disk. Further, the amount of data to be accessed at once on the read from the buffer memories or the optical disk may be different from the counterpart on the write thereto.

Preferably, in the above-mentioned embodiments, recorded data are guaranteed when an electric power supply is stopped during reproduction-while-recording. In the normal operation, management data (address information and the like) on recorded data are stored in a memory in the system controller, and the management data are recorded to the recording medium after all the data (for example, data of a program) has been recorded. The recording and reproduction are performed in a sequence of data recording->data reproduction->data recording->data reproduction-> . . . However, management data are lost, for example, when an electric power supply is stopped. Then, even if audiovisual information is recorded in the disk, it cannot be reproduced. Thus, the management data are recorded to the disk periodically, so that the loss of management data due to the stoppage of the electric power supply or the like is prevented. In this example, after a sequence of data recording->data reproduction is repeated for some time, the management data are written to the file management area in the disk. The management data are updated when audiovisual information is recorded. Therefore, it is preferable that the management data are written after the recording of the audiovisual data.

In the above-mentioned embodiments, a restriction may be set for reproduction-while-recording. For example, when a recording zone is distant from a reproduction zone, a seek time becomes longer. Then, the buffer 102 for recording is liable to overflow, or the buffer 105 for reproduction is liable to underflow. Then, when a recording zone is distant from a reproduction zone, the system controller 108 inhibits reproduction-while-recording. As a result, when a user instructs reproduction-while-recording, it is rejected. Practically, a zone range for reproduction-while-recording is limited. For example, reproduction-while-recording is inhibited between zones for which a seek time exceeds a predetermined time, for example, when a recording zone is distant from a reproduction zone more than a threshold (for example, two zones).

Figure 14:
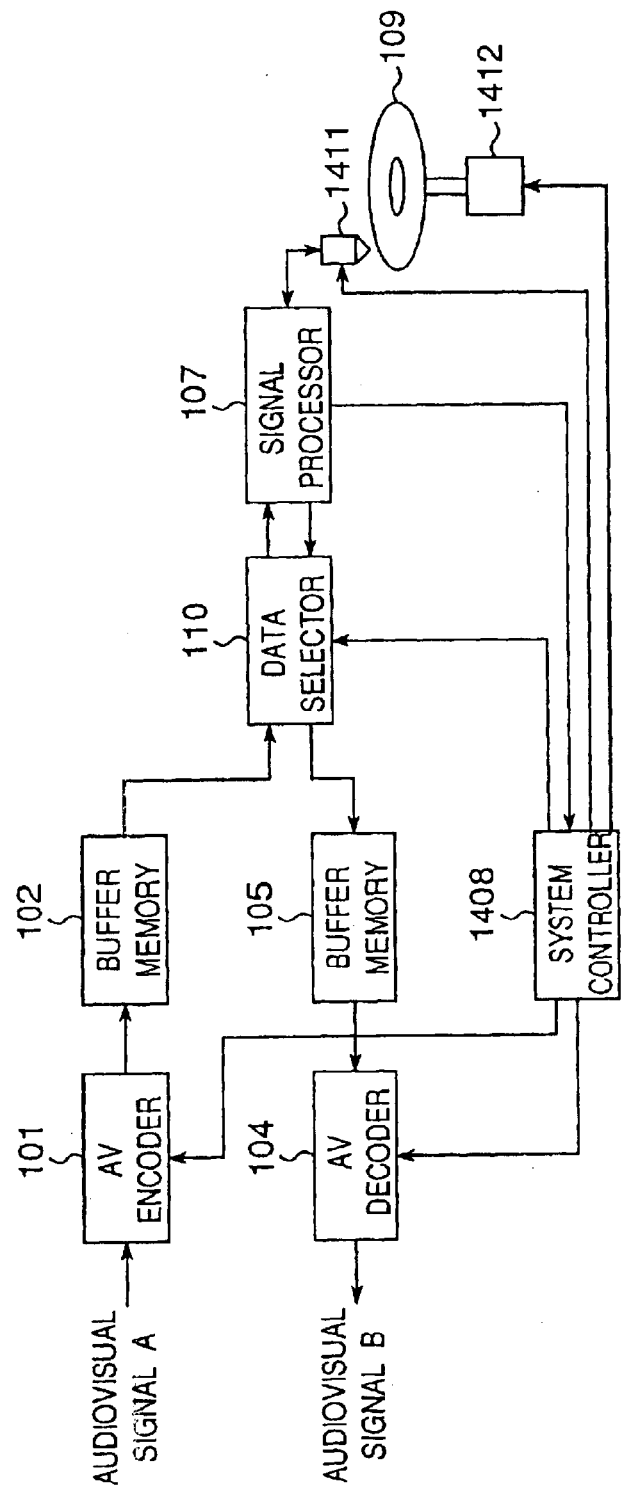
FIG. 14 is a block diagram of an apparatus which records and reproduces data at the same time according to a sixth embodiment of the invention.

FIG. 14 shows a simultaneous recording and reproduction apparatus according to a sixth embodiment of the invention. The simultaneous recording and reproduction apparatus comprises an audiovisual (AV) encoder 101, buffer memories 102 and 105, an audiovisual decoder 104, a recording and reproduction signal processor 107, a system controller 1408, an optical disk 109, a data selector 110, an optical head 1411 and a motor 1412. The apparatus reproduces data from a different zone by keeping the revolution number in the recording zone. (An optical head is also included in the apparatuses in the above-mentioned embodiments, but it is omitted for the ease of explanation.)

Recording is explained first on the simultaneous recording and reproduction apparatus shown in FIG. 14. Audiovisual signals "A" are encoded by the AV encoder 101 to provide a data stream. For example, if the AV encoder 101 is an MPEG (Moving Picture Expert Group) encoder, it generates an image data stream by MPEG encoding on visual signals in the audiovisual signals "A" and an audio data stream by MPEG or AC-3 encoding on audio signals therein. Then, it multiplexes the two data streams as an MPEG system data stream to be outputted. The data stream outputted from the encoder 101 is accumulated in a first buffer memory 102. The data stream accumulated in the first buffer memory 102 is read by the data selector 110 to be inputted to a recording and reproduction signal processor 107. Then, it is subjected to error correction code (ECC) processing, modulation and the like and recorded with the optical head 1411 in the optical disk 109 as a recording medium.

Next, reproduction is explained. Signals read from the optical disk 109 with the optical head 1411 are processed by the signal processor 107 on binarization, demodulation, error correction code processing and the like to become a data stream, which is sent through the data selector 110 to the second buffer memory 105. The data stream read from the second buffer memory 105 is decoded by the audiovisual decoder 104 to provide audiovisual signals "B".

The system controller 1408 controls change-over between the reproducing operation and the recording operation. The system controller 1408 controls the reproduction of data or the recordation of data according to whether the reproducing operation or the recording operation is selected. Further, the system controller 1408 controls the data selector 110 so that data are streamed from the first buffer memory 102 to the signal processor 107 during recording and from the signal processor 107 to the buffer memory 105 during reproduction.

Next, reproduction-while-recording in the simultaneous recording and reproduction apparatus is explained. FIG. 3 shows operations of recording and reproduction in a situation of reproduction-while-recording shown in FIG. 2C. They are explained with reference to FIG. 15 which shows, schematically, the arrangement of zones, tracks and recorded data in the optical disk 109, wherein spiral lines represent tracks. It is assumed here that in each optical disk 109, data are recorded with zone CLV control, that data are recorded in continuous tracks, and that data are recorded from inner side to outer side. In the situation shown in FIG. 15, recording and reproduction are performed in zones 1501 and 1502.

First, a case is explained where recording is performed in zone 1501, while reproduction is performed in zone 1502. Data "b", "d", "f" and "h" have been recorded in regions 1520, 1521, 1522, 1523, while data "a" has been recorded in a region 1510. In this case, after data "a" is recorded in the region 1510, the top of the region 1520 is searched, and the data "b" are reproduced from the region 1520. Next, the top of a region 1511 is searched, and the data "c" are recorded to the region 1511. Then, the top of the region 1521 is searched, and the data "d" are reproduced from the region 1521. During the above-mentioned recording and the reproduction, the revolution number of the optical disk 109 is constant at a revolution number used for recording the data to the zone 1501. Therefore, when the data is reproduced from the zone 1502, the reproduction is performed at the revolution number used for recording the data to the zone 1501. The revolution number of the motor 1412 is controlled according to the current zone to which the system controller 1408 records data. In ZCLV control, the revolution number becomes larger at an inner side. Then, the reproduction from the zone 1502 is performed at a revolution number slower than usual. However, the reproduction from the disk has a much larger margin than the recording. Then, reproduction can be performed correctly when data are reproduced from the zone 1502 at the slow revolution number appropriate for the zone 1501.

Next, another case is explained where recording is performed in the zone 1502, while reproduction is performed in zone 1501. Data "b", "d", "f" and "h" have been recorded in regions 1510, 1511, 1512, 1513, while data "a" has been recorded in a region 1520. In this case, after data "a" is recorded in the region 1520, the top of the region 1510 is searched, and the data "b" are reproduced from the region 1510. Next, the top of the region 1521 is searched, and the data "c" are recorded to the region 1521. Then, the top of the region 1511 is searched, and the data "d" are reproduced from the region 1511. During the above-mentioned recording and the reproduction, the revolution number of the optical disk 109 is constant at a revolution number used for recording the data to the zone 1502. Therefore, when the data is reproduced from the zone 1502, the reproduction is performed at the revolution number used for recording the data to the zone 1501. The revolution number of the motor 1412 is controlled according to the current zone to which the system controller 1408 records data. In ZCLV control, the revolution number becomes larger at an inner side. Then, the reproduction from the zone 1501 is performed at a revolution number faster than usual. However, the reproduction from the disk has a much larger margin than the recording. Then, reproduction can be performed correctly when data are reproduced from the zone 1501 at the faster revolution number appropriate for the zone 1502.

As explained above, the simultaneous recording and reproduction apparatus performs the reproduction-while-recording, wherein while audiovisual signals of a program are being recorded, the recorded signals are reproduced. In the simultaneous recording and reproduction, the revolution number of the optical disk is controlled to be constant at a revolution number appropriate for a zone to which signals are recorded. Because reproduction from a disk has a much larger margin than recording, data can be reproduced correctly when reproduced from a zone at a different revolution number which is appropriate for the zone used for recording.

Then, it is not necessary to change the revolution number at the recording position and at the reproduction position even for a disk under CLV or ZCLV control when the recording operation is changed to the reproduction operation or vice versa in simultaneous recording and reproduction. Therefore, a time between the recording and reproduction operations can be shortened, and operation efficiency is improved. Then, audiovisual signals can be encoded at a high coding rate for recording and reproduction.

In the above-mentioned example, the optical disk 109 is recorded with ZCLV control. However, other control such as CLV control may also be used as far as the revolution number depends on recording position.

Figure 19:
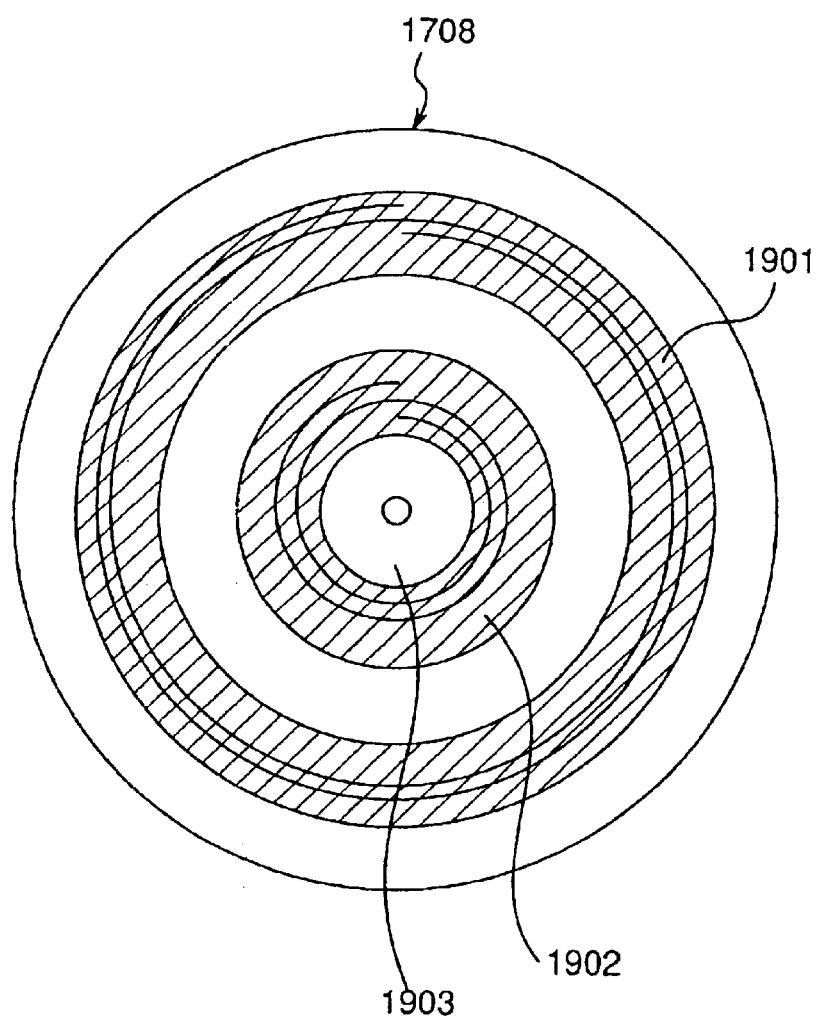
FIG. 19 is a schematic diagram of the arrangement of zones on an optical disk.

In the above-mentioned example, the track is a spiral as shown in FIG. 19. However, the track is not necessarily a spiral.

Figure 15:
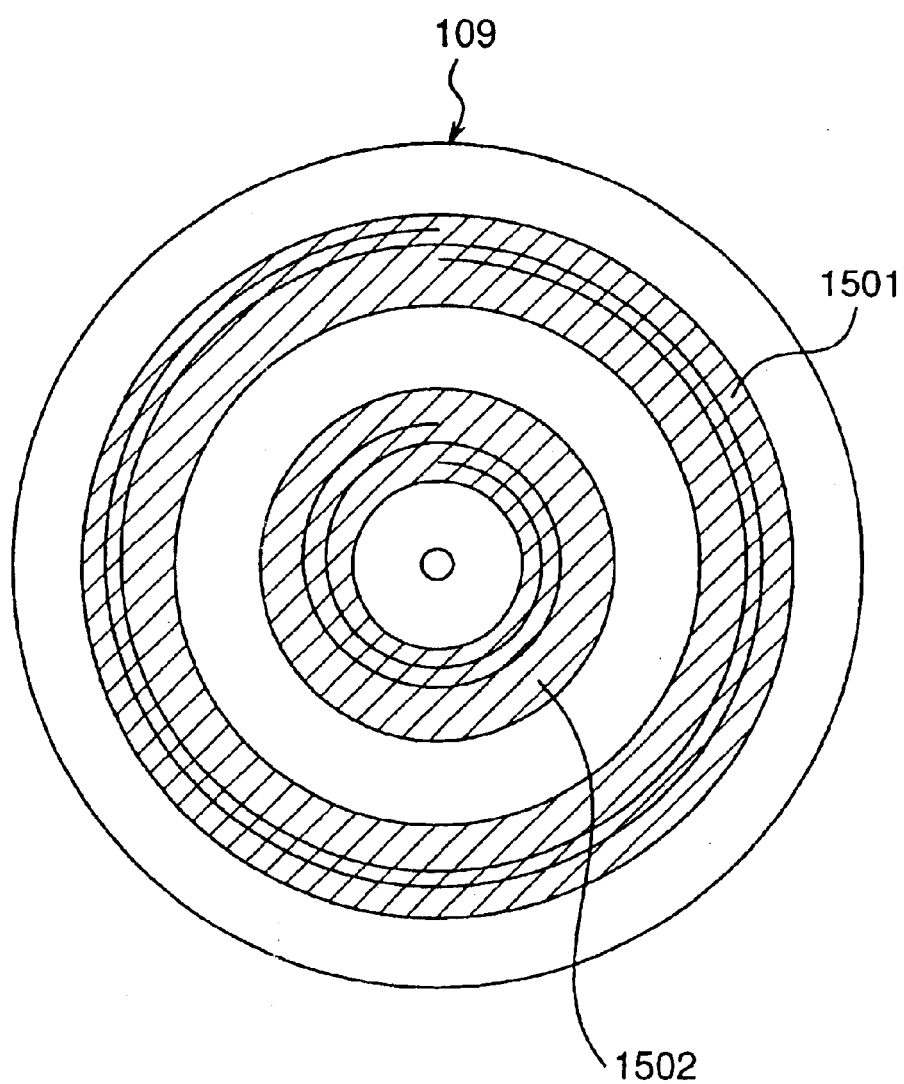
FIG. 15 is a schematic diagram of recording position on an optical disk.

FIG. 15 shows an example, where data continuous in time are recorded in continuous regions. However, the recording position of the data may not necessarily be in continuous regions.

In this embodiment, the amounts of data to be read from or written to the buffer memories and the optical disk are the same. However, the amount of data may be different in each of the read and write. Further, the amount of data to be accessed at once on the read from or the write to the buffer memories may be different from that for the optical disk. Further, the amount of data to be accessed at once on a read from the buffer memories or the optical disk may be different from the counterpart on a write thereto.

In this embodiment, the encoder 101 performs encoding with a fixed bit rate. However, it may perform encoding with a variable bit rate.

In ZCLV, the revolution number is faster in an inner zone. Therefore, when reproduction is performed in a zone for recording in reproduction-while-recording, the recording rate for the zone is liable to be higher than reproduction rate. If the recording rate is higher than the reproduction rate, the picture to be reproduced is stopped at a midpoint in time. Then, in order avoid such a situation, it is preferable to limit zone selection for the simultaneous recording and reproduction as follows. That is, the recording is performed from a zone in an outer side to a zone in an inner side on a recording medium. In other words, the recording zone is always located inside the reproduction zone. When a zone is reproduced in reproduction-while-recording, the zone is reproduced at a revolution number faster than the counterpart used for recording for the zone, and the reproduced picture is not stopped midway. Alternatively, when the recording regions are not continuous, recording is started in a zone at an outer side as much as possible and is continued successively at zones located in an inner side. Then, a similar advantage is realized. Alternatively, recording is performed in a zone along a spiral from an outer peripheral to an inner peripheral in a predetermined unit of data. For example, the unit of data is a plurality of sectors, a plurality of ECC blocks, a plurality of tracks, or an amount of data in correspondence to audiovisual signals to be recorded or reproduced in a predetermined time (for example, alternating recording or reproduction time in reproduction-while-recording). That is, in a zone, recording is performed from an outside to an inside in the predetermined unit in order to shorten a seek time as much as possible.

Next, a simultaneous recording and reproduction apparatus according to a seventh embodiment of the invention is explained with reference to FIGS. 14 and 16. The parts in the apparatus are similar to the counterparts shown in FIG. 14, but the operation of the system controller 1408 is different. The basic operation of the apparatus is similar to that of the counterpart of the seventh embodiment shown in FIG. 14. That is, in simultaneous recording and reproduction (reproduction-while-recording), the revolution number determined at a position for recording on a recording medium is maintained for reproduction. In the simultaneous recording and reproduction apparatus, the bit rate for encoding is controlled to be equal to or smaller than a rate for reading data from a zone at which the revolution number becomes a maximum on a recording medium at a revolution number appropriate at a recording position for which the revolution number becomes a minimum on the recording medium. Points of this apparatus that are different from the counterpart of the sixth embodiment are explained below.

Figure 16:
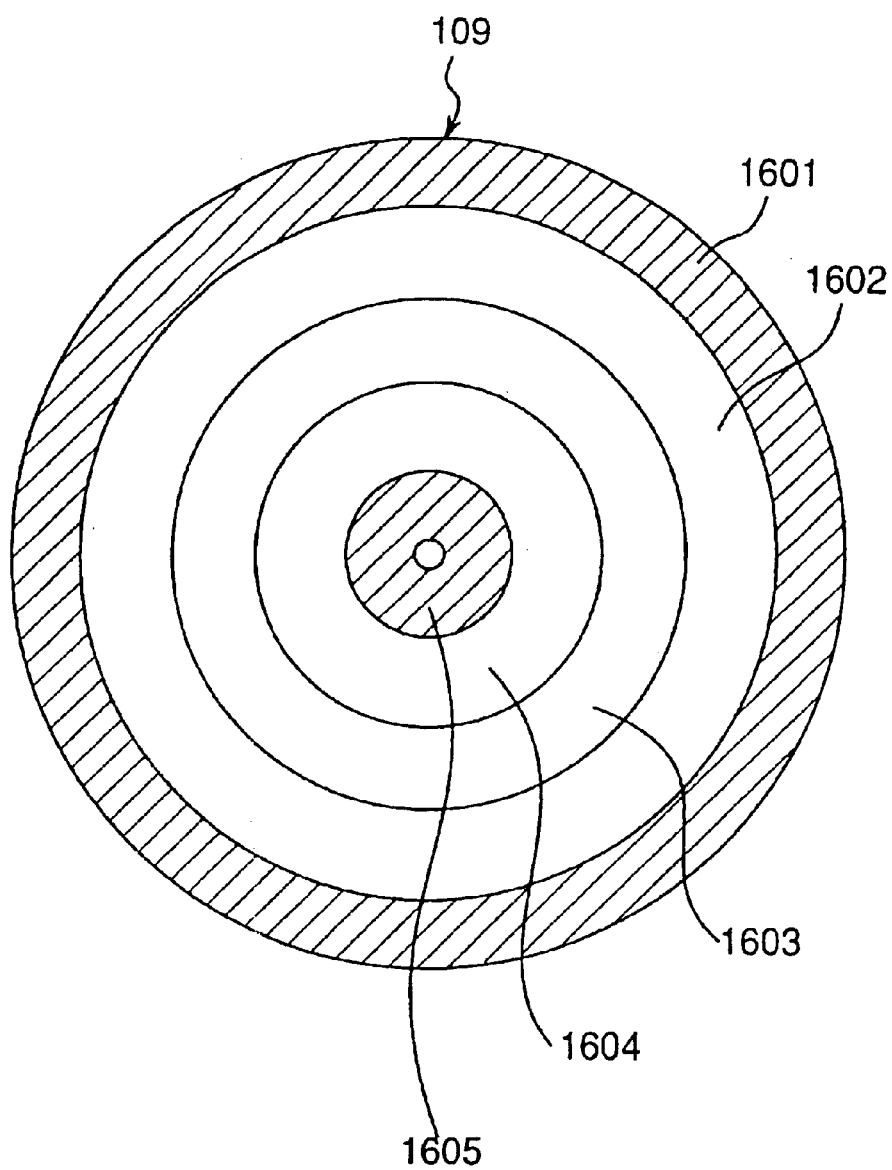
FIG. 16 is a schematic diagram of the arrangement of zones on an optical disk.

FIG. 16 shows a zone structure in an optical disk 109. A case is explained where recording is performed with ZCLV control on the optical disk. As shown in FIG. 16, the optical disk 109 is divided into five zones 1601 to 1605 from an outer peripheral to an inner peripheral. When recording is performed on the optical disk 109, the revolution number is changed for each zone. The revolution number is realized by controlling the motor 1412 by the system controller 1408.

It is assumed that M represents revolution number in the outermost zone 1601, N represents revolution number in the innermost zone 1605, and R represents the maximum recording rate for the optical disk 109. In this case, the system controller 1408 determines coding rate for encoding the audiovisual signal "A" by the encoder 101 to have a smaller value than a value determined by Eq. (1), and the encoder 101 encodes the audiovisual signal at the coding rate determined by the system controller 1408.

$$R \times \frac{M}{N} \quad (1)$$

When the encoder 101 encodes the audiovisual signal at the coding rate given by the system controller 1408, the bit rate may be a fixed bit rate or a variable bit rate which satisfies a bit rate in accordance with an average bit rate with a certain distance.

As explained above, in the simultaneous recording and reproduction apparatus according to this embodiment, the simultaneous recording and reproduction apparatus performs the reproduction-while-recording wherein while the recording of audiovisual signals of a program is being recorded, the recorded signals are reproduced. In the simultaneous recording and reproduction, the revolution number of the optical disk for recording is controlled to be constant at a revolution number appropriate for a zone to which signals are recorded, and the revolution is performed at the revolution number for recording. In the simultaneous recording and reproduction apparatus, the bit rate for encoding is controlled to be equal to or smaller than a rate for reading data from a zone at which the revolution number becomes a maximum on a recording medium at a revolution number appropriate at a recording position for which the revolution number becomes a minimum on the recording medium.

Thus, even when reproduction is performed at the most inner zone while the revolution number is controlled at the minimum or recording is performed at the outermost zone, the data rate to be recorded has a value which guarantees for data reproduction from the most inner zone at the minimum revolution number. Therefore, the real-time character of audiovisual signals obtained by decoding can be ensured.

In the above-mentioned example, the optical disk 109 is recorded with ZCLV control. However, another control such as CLV control may also be used as far as the revolution number depends on recording position.

In this embodiment, the number of the zones is five. However, it may be a different number.

In this embodiment, the amounts of data to be read from or written to the buffer memories and the optical disk are the same. However, the amount of data may be different in each of the read and write operations. Further, the amount of data to be accessed at once on the read from or the write to the buffer memories may be different from that for the optical disk. Further, the amount of data to be accessed at once on read from the buffer memories or the optical disk may be different from the counterpart on write thereto.

The reproduction-while-recording is explained in the above sixth and seventh embodiments. It is desirable in reproduction-while-recording that the seek time is as short as possible in order to prevent overflow and underflow in the buffers. Therefore, before starting recording, a continuous vacant region that is as large as possible is searched for, and data are recorded therein continuously. Then, data are recorded in adjacent regions, and the seek time can be shortened.

In the reproduction-while-recording in the sixth and seventh embodiments, the revolution number is kept constant at a value appropriate for a zone under recording and reproduction is performed at the revolution number. As to recording, the revolution number has some margin. Then, the revolution number may be determined within the margin. For example, when the recording position is at a side out further than the recording position, the reproduction is performed at a revolution number slower than the optimum number. However, the revolution number for recording can be increased somewhat by enhancing the revolution number at the maximum within the margin of the revolution number determined according to the recording position. Thus, the limitation on the coding rate in reproduction-while-recording can be reduced.

Figure 17:
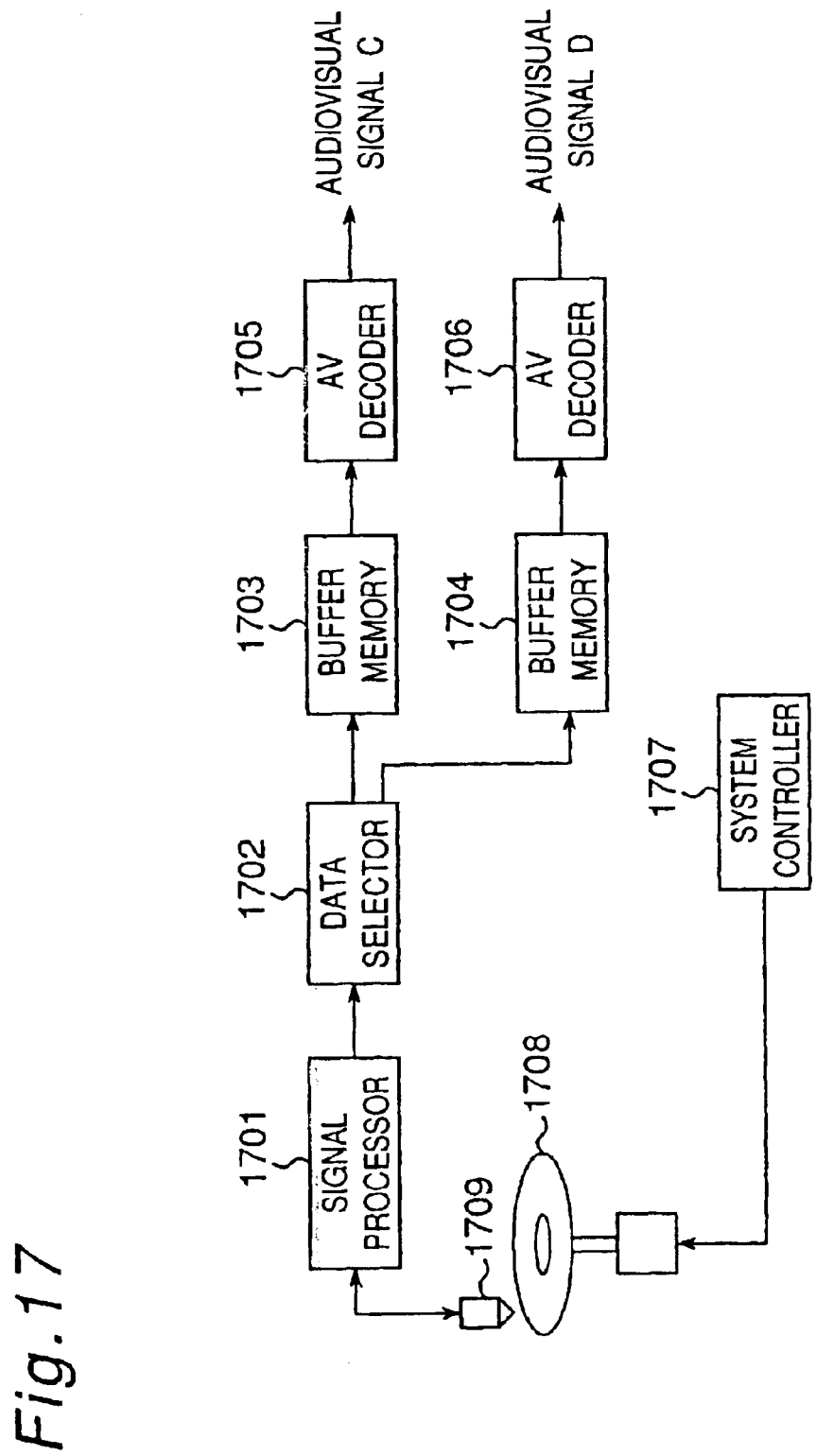
FIG. 17 is a block diagram of an apparatus which records and reproduces data at the same time according to a simultaneous multi-channel reproduction apparatus of an eighth embodiment of the invention.

FIG. 17 shows a simultaneous multi-channel reproduction apparatus according to a eighth embodiment of the invention. The simultaneous multi-channel reproduction apparatus comprises a reproduction signal processor 1701, a data selector 1702, buffer memories 1703 and 1704, audiovisual (AV) decoders 1705, 1706, a system controller 1707, an optical disk 1708 and an optical head 1709. In simultaneous multi-channel reproduction mode, the apparatus reproduces data from an outside zone according to a revolution number for reading from an inner zone.

Figure 18:
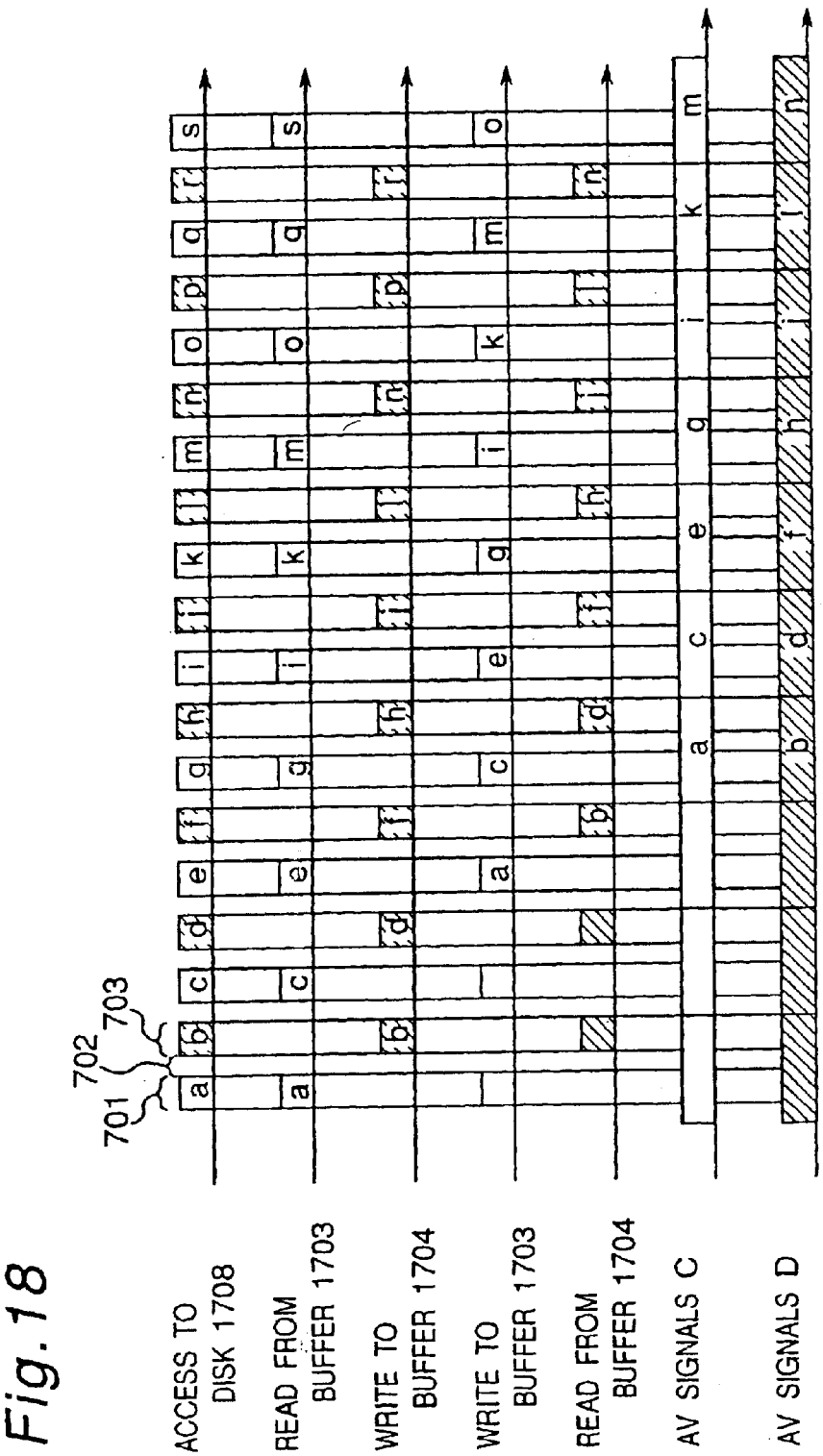
FIG. 18 is a schematic diagram of data flow in simultaneous multi-channel reproduction.

It is assumed that two data streams as shown in FIGS. 20A and B have been recorded in the optical disk 1708. FIG. 18 shows a logical arrangement of the two data streams. FIG. 20A shows the data stream of audiovisual signal "C", and FIG. 20B shows the data stream of audiovisual signal "D".

FIG. 19 shows the zone structure in the optical disk 1708. The ZCLV control is used for the optical disk 1708. A data stream of audiovisual signal "C" is recorded in a zone 1901, and another data stream of audiovisual signal "D" is recorded in a zone 1902.

From the optical disk 1708 explained above, data streams of audiovisual signals "C" and "D" are read for simultaneous reproduction. In this case, FIG. 18 shows a situation of access to the optical disk 1708, situation of access to buffers 1703, 1704, and reproduction of the audiovisual signals "C" and "D". The same signs in FIG. 18 show the same data or the same decoded data.

The operation of the simultaneous multi-channel reproduction apparatus is explained with reference to FIGS. 17–20B. Signals read from the optical disk 1708 with the optical head 1709 are subjected to binarization, demodulation, error correction code processing and the like by the signal processor 1701 for reproduction signals to provide a data stream. Then, the data stream is sent through the data selector 1702 to the buffer memory 1703 or 1704. The data stream read from the buffer memory 1703 or 1704 is decoded by the audiovisual decoder 1705 or 1706 to provide audiovisual signal "C" or "D".

The data selector 1702 selects which of the buffer memories 1703 and 1704 the data stream read from the optical disk is written to. The system controller 1707 controls which of the buffer memories 1703 and 1704 the data stream read from the optical disk is written to, according to whether the data stream of the audiovisual signal "C" or that of the audiovisual signal "D" is read from the optical disk 1708. Here, it is assumed that the data stream of the audiovisual signal "C" is written to the buffer memory 1703, and that of the audiovisual signal "D" is written to the buffer memory 1704.

As shown in FIG. 18 as "access to disk 1708", in the access to the optical disk 1708, data streams of audiovisual signals "C" and "D" are read alternately, wherein areas with hatching means the reading of the data stream of the audiovisual signal "D" and areas without hatching means that of audiovisual signal "C". For example, after data "a" (a part of data stream of audiovisual signal "C") is reproduced in a period 701, the reproduction position of data "b" (a part of data stream of audiovisual signal "D") is searched (period 702), and the data "b" is reproduced in period 703.

As shown in FIG. 3 as "read from buffer 102", the data "a", "c", "e" and the like reproduced from the disk 1708 are written to the buffer memory 1703. On the other hand, as shown in FIG. 3 as "write to buffer 105", the data "b", "d", "f" and the like are written to the buffer memory 1704. After the data written to the buffer memories 1703 and 1704 at the timings shown in FIG. 3 are stored temporarily therein, they are read from the buffer memories 1703, 1704 by the decoders 1705, 1706 at the timings shown in FIG. 3 as "write to buffer 102" and "write to buffer 105", and reproduced at timings shown in FIG. 18 as audiovisual signal "C" and audiovisual signal "D".

The data "a", "c", "e" and the like are recorded in zone 1901, while the data "b", "d", "f" and the like are recorded in zone 1902. Therefore, in the above-mentioned reproduction, the operations of data reproduction from zone 1901, search and move from zone 1901 to 1902, data reproduction from zone 1902 and search and move from zone 1902 to 1901 are repeated. In the reproduction operation, the revolution number of the optical disk 1708 is kept constant at a revolution number for reproduction from zone 1902 is used. Therefore, even when data are reproduced from zone 1901, the revolution number used for reproducing the data from zone 1902 is used. The revolution number is determined according to a revolution number for reproducing an innermost zone among the zones under reproduction, and the motor 1710 is controlled at the predetermined revolution number. In ZCLV control, the revolution number is larger at the inner side. Then, in this case, the reproduction from zone 1901 is performed at a faster revolution number than usual. However, because data reproduction from the disk has a very large margin, reproduction can be performed correctly even when data are reproduced from zone 1901 at the faster revolution number appropriate for reproduction from zone 1902.

As explained above, in the simultaneous multi-channel reproduction apparatus, data streams of a plurality of audiovisual signals are reproduced at the same time in time sharing from a recording medium wherein the data streams are recorded. In the simultaneous multi-channel reproduction, the revolution number of the optical disk is kept constant at a value appropriate for a zone at an inner peripheral side, and it is used for the of data from a zone at an outer peripheral side. Because data reproduction from the disk has a very large margin, reproduction can be performed correctly even when data are reproduced from an outer zone at the faster revolution number appropriate for reproduction from an inner zone.

According to the above-mentioned operation, when reproduction from a channel is changed to that from another channel in the simultaneous multi-channel recording, it is not necessary to change the revolution number according to the reproduction position even for a disk under CLV or ZCLV control. Therefore, a time for moving a zone shift can be shortened, and operation efficiency is improved, and data streams on audiovisual signals obtained at high coding rate can be reproduced in multi-channels. Further, because the revolution number is set at a value for an inner zone, data rate can be guaranteed when data recorded in an inner zone is reproduced.

In the above-mentioned example, the optical disk 109 is recorded with ZCLV control. However, another control such as CLV control may also be used as far as the revolution number depends on recording position.

In the above-mentioned example, the track is spiral as shown in FIG. 19. However, the track is not necessarily spiral.

FIG. 15 shows an example where data continuous in time are recorded in the same zone. However, the recording position of the data may not be in the same zone.

In the above-mentioned example, data of two channels are reproduced at the same time. However, data of three or more channels can be reproduced at the same time.

In this embodiment, when two channels are reproduced at the same time, the revolution number is controlled for the inner zone among the zones to be reproduced. However, the reproduction may be performed always at a revolution number equal to or larger than that for the reproduction for the innermost zone. For example, when the optical disk 1708 is reproduced, reproduction may be performed at a revolution number equal to or larger than that for the zone 1903.

As explained above, in the simultaneous multi-channel reproduction, the revolution number of the optical disk is kept constant at a value appropriate for the innermost zone, and reproduction is performed at the revolution number when data are reproduced from a zone at an outer side. If reproduction is performed at a revolution number equal to or larger than that for the innermost zone, data rate for reproduction can be guaranteed when data are reproduced from any zone.

In the above-mentioned simultaneous recording and reproduction apparatus, the recording and reproduction for a recording medium is performed preferably by a head (or by the same head). This simplifies the structure of the apparatuses.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

We claim:

1. A simultaneous recording and reproduction apparatus comprising:
    an encoder operable to encode first input signals to provide a first data stream;
    a first buffer memory operable to accumulate the first data stream encoded by said encoder;
    a data recorder operable to record the first data stream read from said first buffer memory to a recording medium;
    a data reproducer operable to reproduce the first data stream, which has been recorded previously to the recording medium, as a second data stream;
    a second buffer memory operable to accumulate the second data stream read from said data reproducer;
    a decoder operable to read the second data stream from said second buffer memory and decode the second data stream to provide second signals; and
    a system controller operable to set a coding rate for the first signals in said encoder,
    wherein said system controller is also operable to control said data recorder and said data reproducer to perform recording and reproduction alternately in time, and
    wherein when a simultaneous recording and reproduction mode is set whereby recording of the first signals and reproduction of the second signals are performed alternately in time, said system controller sets the coding rate of said encoder to a value smaller than that in a normal recording mode whereby only the first signals are recorded.

2. The simultaneous recording and reproduction apparatus according to claim 1, wherein said system controller sets the coding rate in said encoder in the simultaneous recording and reproduction mode to be equal to or smaller than a half of that in the normal recording mode.

3. The simultaneous recording and reproduction apparatus according to claim 1, further comprising a head operable to perform the recording and the reproduction for the recording medium.

4. The simultaneous recording and reproduction apparatus according to claim 1, wherein the first and second data streams are code data of visual or audio signals.

5. The simultaneous recording and reproduction apparatus according to claim 1, wherein the recording medium is an optical disk.

6. The simultaneous recording and reproduction apparatus according to claim 1, wherein said system controller is operable to update management data of data recorded in the recording medium between the recording and the reproduction.

7. The simultaneous recording and reproduction apparatus according to claim 1, wherein said system controller inhibits alternating the recording and the reproduction when a recording position of said data recorder is separated from a reproduction position of said data reproducer by more than a predetermined distance.

8. A simultaneous recording and reproduction apparatus comprising:
    an encoder operable to encode first input signals to provide a first data stream;
    a first buffer memory operable to accumulate the first data stream encoded by said encoder;
    a data recorder operable to record the first data stream read from said first buffer memory to a recording medium;
    a data reproducer operable to reproduce the first data stream, which has been recorded previously to the recording medium, as a second data stream;
    a second buffer memory operable to accumulate the second data stream read from said data reproducer;
    a decoder operable to read the second data stream from said second buffer memory and decode the second data stream to provide second signals; and
    a system controller operable to set a coding rate for the first signals in said encoder,
    wherein said system controller is also operable to control said data recorder and said data reproducer to perform recording and reproduction alternately in time, and
    wherein when a simultaneous recording and reproduction mode is set whereby recording of the first signals and reproduction of the second signals are performed alternately in time, said system controller sets the coding rate in said encoder so that a sum of a recording rate and a reproduction rate in a predetermined period is smaller than a predetermined bit rate.

9. The simultaneous recording and reproduction apparatus according to claim 8, wherein the encoding by said encoder is variable bit rate encoding.

10. The simultaneous recording and reproduction apparatus according to claim 8, wherein the first and second signals are visual or audio signals.

11. The simultaneous recording and reproduction apparatus according to claim 8, further comprising a head operable to perform the recording and the reproduction for the recording medium.

12. The simultaneous recording and reproduction apparatus according to claim 8, wherein the first and second data streams are obtained by encoding visual or audio signals.

13. The simultaneous recording and reproduction apparatus according to claim 8, wherein the recording medium is an optical disk.

14. The simultaneous recording and reproduction apparatus according to claim 8, wherein said system controller is operable to update management data of data recorded in the recording medium between the recording and the reproduction.

15. The simultaneous recording and reproduction apparatus according to claim 8, wherein said system controller inhibits alternating the recording and the reproduction when a recording position of said data recorder is separated from a reproduction position of said data reproducer by more than a predetermined distance.

16. A simultaneous recording and reproduction apparatus comprising:
- an encoder operable to encode first input signals to provide a first data stream;
- a first buffer memory operable to accumulate the first data stream encoded by said encoder;
- a data recorder operable to record the first data stream read from said first buffer memory to a recording medium;
- a data reproducer operable to reproduce the first data stream, which has been recorded previously to the recording medium, as a second data stream;
- a second buffer memory operable to accumulate the second data stream read from said data reproducer;
- a decoder operable to read the second data stream from said second buffer memory and decode the second data stream to provide second signals; and
- a system controller operable to set a coding rate for the first signals in said encoder,
- wherein said system controller is also operable to control said data recorder and said data reproducer to perform recording and reproduction alternately in time, and
- wherein said encoder performs encoding at a variable bit rate and decreases a bit rate for encoding when said first buffer memory is going to overflow.

17. The simultaneous recording and reproduction apparatus according to claim 16, wherein the first and second signals are visual or audio signals.

18. The simultaneous recording and reproduction apparatus according to claim 16, further comprising a head operable to perform the recording and the reproduction for the recording medium.

19. The simultaneous recording and reproduction apparatus according to claim 16, wherein the first and second data streams are obtained by encoding visual or audio signals.

20. The simultaneous recording and reproduction apparatus according to claim 16, wherein the recording medium is an optical disk.

21. The simultaneous recording and reproduction apparatus according to claim 16, wherein said system controller is operable to update management data of data recorded in the recording medium between the recording and the reproduction.

22. The simultaneous recording and reproduction apparatus according to claim 16, wherein said system controller controls said data recorder and said data reproducer to preform the recording and the reproduction alternately at a predetermined time rate.

23. The simultaneous recording and reproduction apparatus according to claim 22, wherein the predetermined time rate is a time determined by a length of a sector, and ECC block or a plurality of ECC blocks.

* * * * *

UNITED STATES PATENT AND TRADEMARK OFFICE
CERTIFICATE OF CORRECTION

PATENT NO. : 7,095,688 B2 Page 1 of 1
APPLICATION NO. : 10/652203
DATED : August 22, 2006
INVENTOR(S) : Satoshi Kondo et al.

It is certified that error appears in the above-identified patent and that said Letters Patent is hereby corrected as shown below:

On the Title Page

Please insert the following: --(73) Assignee: Matsushita Electric Industrial Co., Ltd., Osaka (JP)--.

Please insert the following: --(74) *Attorney, Agent, or Firm*—Wenderoth, Lind & Ponack, L.L.P.--.

Signed and Sealed this

Seventh Day of August, 2007

JON W. DUDAS
*Director of the United States Patent and Trademark Office*